(12) United States Patent
McKeag et al.

(10) Patent No.: US 10,539,934 B2
(45) Date of Patent: Jan. 21, 2020

(54) OUTAGE AND SWITCH MANAGEMENT FOR A POWER GRID SYSTEM

(71) Applicant: GENERAL ELECTRIC TECHNOLOGY GMBH, Baden (CH)

(72) Inventors: Tory McKeag, Redmond, WA (US); John Awald, Redmond, WA (US); Kevin Curtis, Redmond, WA (US); Reynaldo Bernal, Redmond, WA (US)

(73) Assignee: General Electric Technology GmbH, Baden (CH)

( * ) Notice: Subject to any disclaimer, the term of this patent is extended or adjusted under 35 U.S.C. 154(b) by 510 days.

(21) Appl. No.: 14/660,459

(22) Filed: Mar. 17, 2015

(65) Prior Publication Data

US 2015/0261241 A1    Sep. 17, 2015

Related U.S. Application Data

(60) Provisional application No. 61/954,565, filed on Mar. 17, 2014.

(51) Int. Cl.
  *G05B 15/02* (2006.01)

(52) U.S. Cl.
  CPC .................... *G05B 15/02* (2013.01)

(58) Field of Classification Search
  USPC .................. 700/286–287, 291–297
  See application file for complete search history.

(56) References Cited

U.S. PATENT DOCUMENTS

| 7,797,179 | B2* | 9/2010 | Chakraborty | G06Q 10/06 |
| | | | | 702/182 |
| 2004/0236620 | A1* | 11/2004 | Chauhan | G06Q 10/06 |
| | | | | 705/7.14 |
| 2006/0064205 | A1* | 3/2006 | Ying | H01H 9/32 |
| | | | | 700/286 |
| 2009/0287739 | A1* | 11/2009 | Zhang | G06Q 10/06 |
| 2011/0196630 | A1* | 8/2011 | Dong | H02J 3/006 |
| | | | | 702/62 |
| 2012/0253539 | A1* | 10/2012 | McMullin | H02J 3/006 |
| | | | | 700/297 |
| 2012/0283988 | A1* | 11/2012 | Pandey | G06Q 30/06 |
| | | | | 702/179 |

(Continued)

OTHER PUBLICATIONS

Li et al., "A Reliability Based Approach to Transmission Maintenance Planning and Its application in BC Hydro system", 2001, IEEE, pp. 510-515.*

*Primary Examiner* — Jason Lin
(74) *Attorney, Agent, or Firm* — Fitch, Even, Tabin & Flannery LLP

(57) ABSTRACT

Outages and/or switching operations associated with an electrical energy distribution system (e.g., a power grid system) are managed. In an implementation, a system provides for receiving outage request information related to a request to interrupt a power supply provided to a device in an electrical energy distribution system, determining switching information related to a set of steps to de-energize a portion of the electrical energy distribution system associated with the device based on the outage request information, and performing a switching operation to de-energize the portion of the electrical energy distribution system based on the switching information.

20 Claims, 13 Drawing Sheets

(56) References Cited

U.S. PATENT DOCUMENTS

| | | | |
|---|---|---|---|
| 2013/0024037 A1* | 1/2013 | Jin | G05B 17/02 700/292 |
| 2013/0116843 A1* | 5/2013 | Kim | G06Q 50/06 700/292 |
| 2015/0160670 A1* | 6/2015 | Meliopoulos | G01R 21/00 700/291 |

* cited by examiner

OUTAGE AND SWITCH MANAGEMENT FOR A POWER GRID SYSTEM

RELATED APPLICATION

This application claims priority to U.S. Provisional Application No. 61/954,565, filed Mar. 17, 2014, and entitled "eBoss-eterra Outage and Switch Management Module", the entirety of which is incorporated herein by reference.

TECHNICAL FIELD

The disclosed subject matter relates to managing outages and/or switching operations associated with a power grid system.

BACKGROUND

A power grid is a complex and dynamic system that is difficult to manage. Furthermore, a power grid is often integrated with other power grids, resulting in a large-scale power grid system. Real-time technologies (e.g., smart grid technologies) are becoming increasingly popular to manage power transmission and/or power distribution associated with a power grid. However, real-time technologies (e.g., smart grid technologies) that are employed to manage power transmission and/or power distribution associated with a power grid often result in increasingly complex day to day operations and/or a greater volume of day to day operations to support operation of a power grid.

In a conventional power grid system, outages and switching operations are coordinated by operators and/or other power grid personnel as part of a normal operation of the power grid system. For example, outages and switching operations are coordinated by operators and/or other power grid personnel to support transmission of power, generation of power, distribution of power, equipment maintenance, equipment repairs, changes to the power grid system, etc. Furthermore, outages, switching operations and/or unforeseen events associated with the power grid system (e.g., equipment failures, storms, accidents, etc.) are coordinated by operators and/or other power grid personnel. The outages and switching operations also follow strict standards regarding safety of personnel, network reliability, maintenance, and energy quality standards. However, coordinating outages and switching operations in a conventional power grid system is difficult and/or complex. Moreover, coordinating outages and switching operations via operators and/or other power grid personnel often creates delays, inefficiencies and/or reduced performance of a power grid system.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an example implementation, a system provides for receiving outage request information related to a request to interrupt a power supply provided to a device in an electrical energy distribution system, determining switching information related to a set of steps to de-energize a portion of the electrical energy distribution system associated with the device based on the outage request information, and performing a switching operation to de-energize the portion of the electrical energy distribution system based on the switching information.

Additionally, a non-limiting implementation provides for receiving, by a device comprising a processor, information related to a request to interrupt power provided to equipment in a power grid system, generating, by the device, other information related to a set of actions for de-energizing a portion of the power grid system associated with the equipment based on the information, and performing, by the device, a switching operation for de-energizing the portion of the power grid system based on the other information.

In accordance with another example implementation, a computer readable storage device comprises executable instructions that, in response to execution, cause a device comprising a processor to perform operations, comprising: receiving a request to interrupt electrical power provided to a portion of an electrical energy distribution system, determining a set of actions associated with the electrical energy distribution system based on the request, and performing a switching operation to interrupt the electrical power provided to the portion of the electrical energy distribution system in response to a determination that the set of actions are performed.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
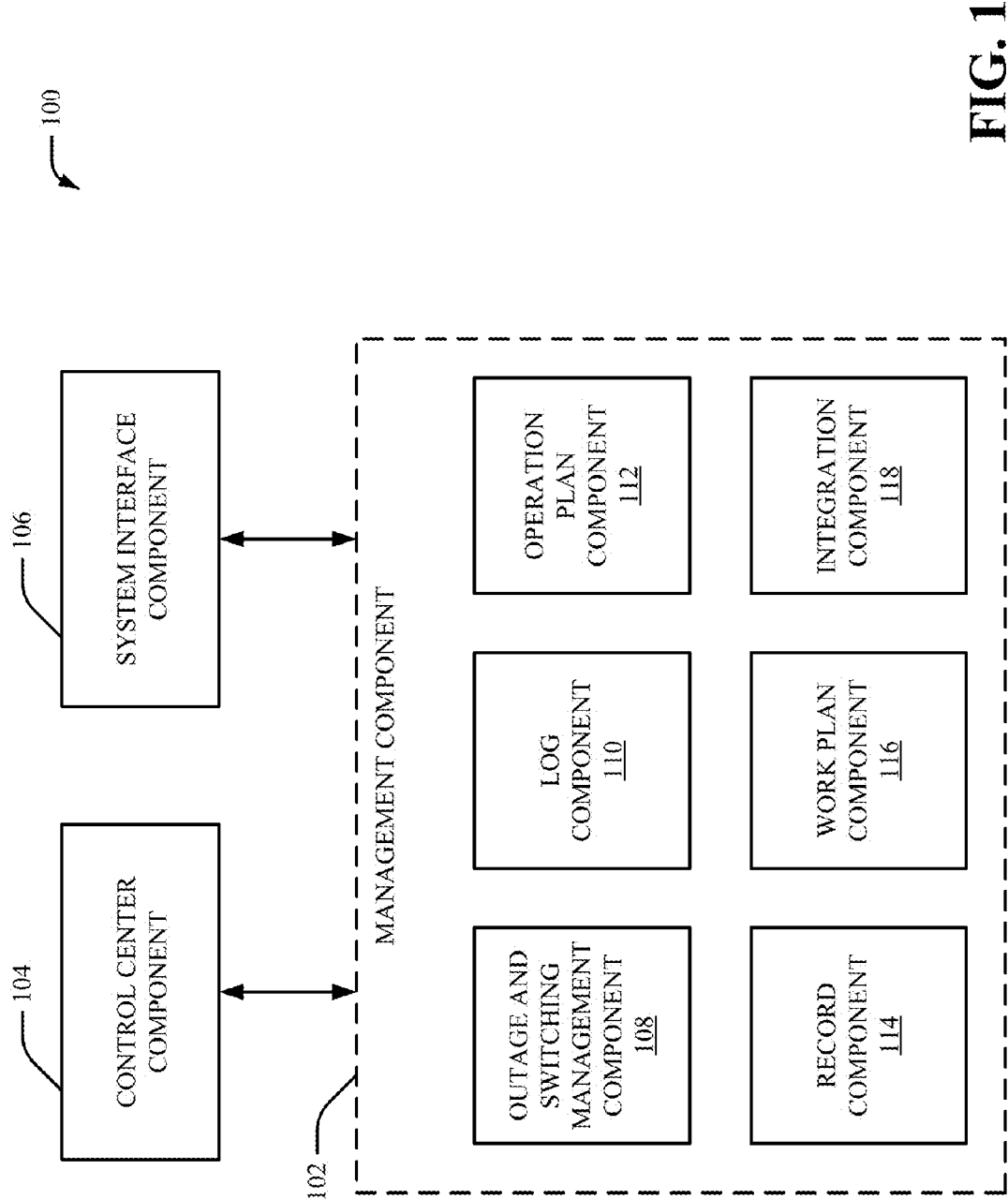
FIG. 1 is an illustration of a system in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As used in this application, the terms "component," "system," "platform," "interface," "node", "source", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

In a conventional power grid system, outages and switching operations are coordinated by operators and/or other power grid personnel as part of a normal operation of the power grid system. For example, outages and switching operations are coordinated by operators and/or other power grid personnel to support transmission of power, generation of power, distribution of power, equipment maintenance, equipment repairs, changes to the power grid system, etc. Furthermore, outages, switching operations and/or unforeseen events associated with the power grid system (e.g., equipment failures, storms, accidents, etc.) are coordinated by operators and/or other power grid personnel. The outages and switching operations also follow strict standards regarding safety of personnel, network reliability, maintenance, and energy quality standards. However, coordinating outages and switching operations in a conventional power grid system is difficult and/or complex. Moreover, coordinating outages and switching operations via operators and/or other power grid personnel often creates delays, inefficiencies and/or reduced performance of a power grid system.

To these and/or related ends, techniques for managing outages and switching operations associated with an electrical energy distribution system (e.g., a power grid system, etc.) are presented. For example, an outage and switching operation management system can be integrated with real-time systems to support operational work processes associated outages and/or switching operations. The outage and switching operation management system can maintain control and/or supervision of outages and/or switching operations by adding checks and balances associated with outages and/or switching operations, automating tracking of outages and/or switching operations, managing pace of work orders associated with outages and/or switching operations, etc. The outage and switching operation management system can provide tools to facilitate definition of tasks for dispatchers and operators, outage scheduling, switching orders, coordination of actions to be performed for outages and/or switching operations, definition of a daily operation plan for outages and/or switching operations, logging of events associated with outages and/or switching operations, recording of actions performed with respect to outages and/or switching operations, data integration with a control center system and/or other systems, inter-process integration with a control center system and/or other systems etc.

In an aspect, the outage and switching operation management system can be integrated with a control center (e.g., data and/or inter-processes associated with a control center), a communications system, a voice system, an emergency system, a call center system and/or another real-time system to maintain control and/or supervision of outages and/or switching operations. In another aspect, the outage and switching operation management system can be integrated with a control center (e.g., data and/or inter-processes associated with a control center), a communications system, a voice system, an emergency system, a call center system and/or another real-time system to produce log records for tasks associated with outages and/or switching operations. As such, asset management, grid reliability, distributed resource management, safety management, scheduling of operations, efficiency and/or performance for an electrical energy distribution system (e.g., a power grid system) can be improved.

FIG. 1 is an illustration of a system 100, which facilitates managing outages and/or switching operations associated with an electrical energy distribution system (e.g., a power grid system, etc.) in accordance with aspects of the subject disclosure. System 100 can include a management component 102, a control center component 104 and a system interface component 106. The management component 102 can include an outage and switching management component 108, a log component 110, an operation plan component 112, a record component 114, a work plan component 116 and/or an integration component 118.

The management component 102 can manage processes associated with an electrical energy distribution system (e.g., a power grid system, etc.). The management component 102 can be integrated with the control center component 104. The control center component 104 can manage power transmission and/or power distribution associated with the electrical energy distribution system. For example, the control center component 104 can measure, analyze and/or control power transmission and/or power distribution associated with the electrical energy distribution system. The control center component 104 can additionally or alternatively manage other real-time operations associated with the electrical energy distribution system. In an aspect, the control center component 104 can analyze power flows, control automated processing of alarms, obtain and/or analyze measurement data (e.g., associated with a synchrophasor and/or another measuring device), monitor relay data, monitor oscillation data and/or manage other data associated with the electrical energy distribution system.

The control center component 104 can be associated with a energy management system (EMS), a distribution management system (DMS) control system and/or a supervisory control and data acquisition (SCADA) system. For example, the control center component 104 can manage limits (e.g., set point limits) associated with the electrical energy distribution system, alarms and/or overloads associated with the electrical energy distribution system, tagging data for equipment associated with the electrical energy distribution system and/or archiving of data associated with the electrical energy distribution system. Additionally or alternatively, the control center component 104 can manage faults associated with the electrical energy distribution system (e.g., via a fault location isolation and service restoration (FLISR) system), monitor and/or study the electrical energy distribution system, implement an open metering system (OMS) and/or implement a distribution training simulator. Additionally or alternatively, the control center component 104 can perform network power analysis including contingency analysis, determine available transfer capacity, perform network power outage evaluation and/or implement a network power training simulator. In an aspect, the control center component 104 can be associated with an operator console.

The management component 102 can also be integrated with the system interface component 106. The system interface component 106 can provide an interface to one or more external systems and/or one or more regional transmission organizations. The system interface component 106 can also provide and/or maintain information associated with common alarms and/or calls, voice logging, weather events and/or other information associated with external systems and/or regional transmission organizations. Additionally, the system interface component 106 can maintain a knowledge database and/or can maintain information associated with customer service, public affairs, emergency services (e.g., police services, fire services, other emergency services, etc.) and/or customers that utilize power from the electrical energy distribution system.

To facilitate managing outages and switching operations associated with an electrical energy distribution system, the outage and switching management component 108 can employ information associated with the control center component 104 and/or the system interface component 106. For example, the outage and switching management component 108 can employ information, such as but not limited to, power application information, emergency and call center information, power generation information, power transmission information, power distribution information, power grid knowledge information, substation information, EMS/DMS information, field crew information, voice information, communications information, maintenance information, power grid planning information, energy market information and/or other information associated with the control center component 104, the system interface component 106 and/or the electrical energy distribution system.

Moreover, the outage and switching management component 108 can be an integrated EMS and/or tagging solution of the management component 102. The outage and switching management component 108 can be associated with an EMS, a DMS, a tagging system, a SCADA system and/or another system to facilitate management of outages and/or switching operations. For example, the outage and switching management component 108 can be associated with request, validation, study, scheduling, implementation, and/or verification of outages and/or switching requests. The outage and switching management component 108 can be automated and/or can be integrated with respect to supervisory control, data acquisition and/or power analysis.

The outage and switching management component 108 can also manage clearance requests, switching requests and/or switching orders. In an aspect, the outage and switching management component 108 can facilitate automation of a process required to request, review, approve and/or implement clearance requests and/or switching requests. The outage and switching management component 108 can facilitate communications, record keeping, management and/or reporting for processes associated with outages and/or switching operations. Furthermore, the outage and switching management component 108 can facilitate review and/or study of the effects of clearance requests and/or switching requests with respect to the electrical energy distribution system, record clearance request and/or switching request assignments, generate clearance reports and/or switching reports, track active and/or historical records associated with clearance requests and/or switching requests, etc. The outage and switching management component 108 can also support separate switching operations by transmission groups (e.g., stations and/or plants, etc.) and distribution groups. Therefore, the transmission groups and the distribution groups can be independent transmission and/or distribution OSM applications. In cases where coordination of outages is needed across the groups (e.g., the transmission groups and/or the distribution groups), the outage and switching management component 108 can provide appropriate information to the groups and/or can manage workflow processing associated with the groups. The outage and switching management component 108 can also manage outage requests. The outage and switching management component 108 can provide for the process required to create, submit, check, verify, approve, analyze and schedule equipment outage requests. The outage request process managed by the outage and switching management component 108 can enable process control and/or notification of the status of each outage to ensure proper tracking and/or auditing of changes to the electrical energy distribution system as a result of each outage. Moreover, the outage and switching management component 108 can manage the lifecycle of the number of tasks and/or actions that, collectively, are used to complete an outage and/or switch management process.

With respect to switching orders, the outage and switching management component 108 can manage a process required to plan, define, organize, verify, communicate and/or execute switching steps required to de-energize and/or isolate a portion of the electrical energy distribution system. The outage and switching management component 108 can establish safety clearance with respect to construction, maintenance and/or repair work to the electrical energy distribution system. Furthermore, the outage and switching management component 108 can be integrated into a EMS and/or a DMS to allow for automatic generation of tags, switching of equipment, verification of measurements and/ or capturing of data. The outage and switching management component 108 can also manage a reverse process required to energize a new component of the electrical energy distribution system or restore the electrical energy distribution system in the event of a component failure (e.g., the outage and switching management component 108 can manage emergency restoration switching). In certain implementations, the outage and switching management component 108 can assign tasks and/or actions associated with an outage and/or a switching operation based on qualifications and/or training associated with personnel.

Permits associated with an outage and/or a switching operation can also be managed by the outage and switching management component 108. For example, the outage and switching management component 108 can manage a process required to create, issue, transfer, release and/or close authorizations associated with an outage and/or a switching operation. The outage and switching management component 108 can also manage isolation points. For example, the outage and switching management component 108 can facilitate identifying required isolation points in a request. Furthermore, the outage and switching management component 108 can employ isolation points to verify that a switching order used to implement an outage isolates specified points.

The outage and switching management component 108 can also manage secondary equipment associated with an outage and/or a switching operation. In one example, the outage and switching management component 108 can manage equipment that is not directly related to an outage and/or a switching operation in the electrical energy distribution system, but is required to ensure safety when performing field operations. Equipment affected by an outage and/or a switching operation can also be managed by the outage and switching management component 108. For example, the outage and switching management component 108 can facilitate identifying equipment that is indirectly affected by an outage request, so that as part of the outage analysis, special attention is given to operation limits of the affected equipment. Affected equipment can include, but is not limited to, transmission lines, transformers and/or other equipment that may become overloaded due to redistribution of power flow during a switching operation.

Furthermore, the outage and switching management component 108 can manage relay targets. For example, the outage and switching management component 108 can facilitate determining changes required in protection equipment to ensure that a switching operation does not cause unexpected relay triggers. Relay targets can be associated with a protection study and/or switching order work associated with a switching operation. Management of relay targets can ensure that protection configuration of the electrical energy distribution system is properly modified before a switching operation and/or is restored to normal values after a switching operation. The outage and switching management component 108 can also manage protection study associated with an outage and/or a switching order. For example, the outage and switching management component 108 can allow integration with applications to analyze changes in power flow due to an outage and/or a switching operation. In another example, the outage and switching management component 108 can allow integration with applications to analyze changes in a protection scheme as a result of a new configuration for the electrical energy distribution system. The outage and switching management component 108 can also present (e.g., via a display of a user device) results of power flow studies and/or protection studies.

In an aspect, the outage and switching management component 108 can also support outage analysis, backend application integration and/or operator log integration. Outage analysis of the outage and switching management component 108 can be an integration bridge that allows a user to prepare data and/or integrate with power applications employed to evaluate effects of outage requests. An outage scheduler of the outage and switching management component 108 can allow an operator to prepare scenarios associated with the electrical energy distribution system and/or to automate extraction and transfer of data from a database (e.g., an OSM database). The outage and switching management component 108 can also include a plurality of integration interfaces employed to send and/or receive data to other systems (e.g., to facilitate network operations, such as but not limited to, submitting, approving and/or managing planned and unplanned network outages, etc.). In one example, the outage and switching management component 108 can be integrated with a common equipment model system, a pager system for notifications, personnel authorization and training systems for validation, outage evaluation systems for analysis and identification of critical outages, a SCADA system, a tagging system and/or another system to facilitate managing outages and/or switching operations.

In another aspect, the outage and switching management component 108 can provide a central repository for planning, communications, record keeping, management and/or reporting of switching operations associated with an electrical energy distribution system. The outage and switching management component 108 can also manage process flow for submission, validation, approval, implementation and/or verification of clearance requests and/or switching orders. Furthermore, the outage and switching management component 108 can provide support for studying effects of each request in the electrical energy distribution system, recording of assignments of clearance and/or switching requests to personnel, verifying personnel involved in operations associated with the electrical energy distribution system, reporting of clearance and switching operations, tracking of active and historical clearances and switching records, etc. Moreover, the outage and switching management component 108 can provide enforcement of security via tagging, automation and/or adherence to an approved switching plan. Additionally, the outage and switching management component 108 can manage lifecycle of requests and/or can coordinate submissions, validations and/or approval of switching requests that: coordinate work from all entities associated with an outage or switch request, allow for creation of requests, provide for request validation, provides for dispatcher verification, enable permit creation, enable detail switching planning, enables dispatcher power flow study, enable scheduler review and approval, enable switching implementation, enable automated tagging, enable control center SCADA actions, enable switching recording, enable back out implementation and/or provide for reports associated with an outage or switch request.

The log component 110 can manage events associated with the electrical energy distribution system. For example, the log component 110 can facilitate registering and/or tracking events in the electrical energy distribution system, registering abnormal conditions and/or deviations from an operation plan for the electrical energy distribution system, etc. The log component 110 can also manage communication of information related to the electrical energy distribution system (e.g., at a beginning of an operator work shift, in response to an event in the electrical energy distribution system, etc.). Furthermore, the log component 110 can manage operator logging and/or notifications. The log component 110 can generate and/or maintain a daily chronological record used to capture events and/or incidents associated with the electrical energy distribution system, record updates and follow ups, record when work is requested from other departments, record when notifications are generated, record when instructions are followed, record actions and/or decisions associated with the electrical energy distribution system, etc. As such, a record of daily activities associated with the electrical energy distribution system can be generated and/or maintained by the log component 110.

The log component 110 can manage one or more log records. For example, the log component 110 can update log entries, update action entries, update notification entries and/or update shift change records. In one example, the log component 110 can manage the lifecycle of records that collectively make up a log record. In an aspect, the outage and switching management component 108 can record switching actions of a switching order associated with the electrical energy distribution system in an operator log associated with the log component 110. A reference between records (e.g., switching actions, etc.) can be maintained by the log component 110. In certain implementations, the log component 110 can generate and/or manage a master log record. A log can be generated by the log component 110, in one example, in response to a new event, an incident or an abnormality associated with the electrical energy distribution system. In another example, a log can be generated by the log component 110 in response to a determination that a new actions is identified (e.g., when a switching operations is initiated, etc.). A log record can include a timestamp associated with a record and/or other information associated with the record (e.g., determination of equipment, a location in the electrical energy distribution system associated with the event, summary and/or details of the event, etc.). A log record can also include a number of classification fields for later reporting, a reference to a business object related to a record (e.g., EMS alarm, OSM request or switching operation, phone call, etc.). Furthermore, a record log can facilitate tracking status of a process required to close a record.

Updated entries of a log record can be employed to maintain a log of updates to an original event, annotations associated with the original event and/or observations associated with the original event. Action entries of a log record can be employed to initiate and/or record decisions and actions associated with an event. Action entries can also be employed to track initiation, status and/or completion of actions, determine personnel associated with an action, reference details of actions in other systems, etc. Notification entries of a log record can be employed to manage communications and/or notifications issued by the management component 102. In one example, the notification entries can be employed to record information associated with notifications sent to or received by external entities. In certain implementations, the log component 110 can generate and/or maintain a shift change record. A shift change record can be employed by an operator to communicate information to another operator associated with a different work shift. Therefore, information required to continue system operation can by provided to the other operator. In one example, the shift change record can provide a contextual summary of outstanding issues associated with the electrical energy distribution system. Also, the log component 110 can support process integration functionalities, such as but not limited to, creation of forced outage requests from information associated with an operator log, creation of interruption records directly from information associated with an operator log, propagation of notifications based on area of responsibility subscriptions to events, integrated creation of operator logs associated with EMS/DMS alarms, integrated creation and removal of equipment information tags from operator log actions, integrated initiation of repair work in external system from an operator log, integrated creation of operator logs from external systems and/or automatic creation of operator log in response to an outage and/or switching operation associated with the outage and switching management component 108.

The operation plan component 112 can compile information to facilitate planning a work day for an operator, collect expected operating conditions and/or limits associated with electrical energy distribution system, collect a list of outages in the electrical energy distribution system, collect reliability studies associated with the electrical energy distribution system, capture scheduling changes associated with the electrical energy distribution system, maintain references related to prepared contingency plans and/or manage other information associated with an operation plan for the electrical energy distribution system. In an aspect, the operation plan component 112 can manage a daily operation plan. The daily operation plan can capture expected operating conditions and work tasks (e.g., actions, events, etc.) for a 24 hour time period. The daily operation plan can facilitate managing significant outages associated with the electrical energy distribution system, scheduler notes, expected operation limits, reliability studies associated with the electrical energy distribution system and/or contingency plans associated with the electrical energy distribution system.

In one example, the operation plan component 112 can generate a list of planned outages that effect (e.g., significantly effect) system operation and/or limits associated with electrical energy distribution system. The operation plan component 112 can also record expected data (e.g., expected operation limits, loads, power generation and interchange, etc.) and/or can compare expected data to actual operation flows (e.g., to facilitate analyzing current outages, etc.). The operation plan component 112 can also include process integration functionalities that allow an operator to capture data from a system (e.g., an EMS, etc.) to collect e required data. The process integration functionalities can include, but is not limited to, integration with an OSM to allow selection of significant outages, integration with an EMS to allow import of operating limits, integration with a scheduling system to allow import of the generation schedules, integration with a load forecast system to allow import of a load forecast, integration with a market interface to allow import of market and interchange schedules, support for upload of reliability studies summaries as attachments, support for upload of contingency plans as attachments and/or support for capturing of the reliability studies as references to an external system.

The record component 114 can maintain a log of events associated with the electrical energy distribution system, capture references to alarms, estimate number of affected customers associated with an outage, record dispatch orders for repair crews, analyze triggered relays, maintain a list of triggered relays and/or record other information associated with the electrical energy distribution system. In one example, the record component 114 can obtain information required to determine reasons and/or effects of interruptions. In another example, the record component 114 can determine actions and/or sequence of events required to restore at least a portion of the electrical energy distribution system back to a normal state. The record component 114 can manage the aspects of an interruption, such as but not limited to, event records, triggered relays, impact on customers, restoration orders and/or workforce dispatch.

In an aspect, a log (e.g., an event record) generated by the record component 114 can be a starting point for collecting information associated with an interruption in the electrical energy distribution system. A log (e.g., an event record) generated by the record component 114 can also be employed to collect information associated with a set of actions to be performed to recover from the interruption. For example, a log (e.g., an event record) generated by the record component 114 can be an event log employed to identify an original cause of an interruption in the electrical energy distribution system and/or to identify references to a set of alarms that originally detected the interruption. In one example, a log (e.g., an event record) can be generated in response to a notification (e.g., a phone call, etc.) and/or can be employed to update status of equipment in a non-monitored portion of the electrical energy distribution system. Each event can be associated with information, such as but not limited to, a location in the electrical energy distribution system, a reason for the outage, a start time associated with the outage, an expected end time associated with the outage, an EMS state, impact on output power, work force dispatch information, restoration orders to establish repair clearances, triggered relays associated with an outage, alarm identification, triggered relay identification, customer impact analysis, restoration order integration, interruption reporting, etc.

In certain implementations, the record component 114 can be integrated with an SCADA system and/or an alarm system to determine a list of alarms related to an interruption in the electrical energy distribution system. The record component 114 can process the list of alarms and/or filter the list of alarms to facilitate identifying of a cause of the interruption. In one example, the record component 114 can determine a subset of alarms from the list of alarms that are related to a specific interruption. The record component 114 can facilitate initiation of dispatch orders sent to repair crews for the interruption and/or can monitor dispatch orders as statuses associated with the dispatch orders are changed in an external workforce system. The record component 114 can perform customer impact analysis based on EMS and/or DMS data associated with an aggregated station and feeder level. For example, if a portion of a transmission circuit is interrupted, the record component 114 can employ e feeders to estimate number of impacted customers.

The work plan component 116 can generate daily work for an operator, ensure that a list of preparation tasks is completed before a specific action is performed with respect to the electrical energy distribution system, analyze and/or assign workloads, manage a list of daily tasks for an operator and/or edit information for a task as the task is performed, reassigned or cancelled, etc. In an aspect, the work plan component 116 can present daily work for an operator via an operator console based on a daily operation plan. The work plan component 116 can manage work plans, such as but not limited to, a work preparation checklist, workload assignments, a work list and/or task details. The work preparation checklist can be a list of tasks that need to be completed before a work item related to the electrical energy distribution system can be scheduled for execution. Information can be included in the checklist as a function of the nature of the work to be completed. For example, if a task is a switch order, a corresponding power study must be completed, a crew schedule must be checked, and the switchman must be scheduled. The checklist can be employed to verify that a set of tasks are completed so that a switch order can be implemented as planned. The workload assignments can be a tool employed to balance workload by estimating a duration of each task. The work list can be a list of tasks presented to an operator according to an operator work plan. The work list can include all the tasks that an operator is scheduled to complete and/or include status tasks as the tasks are initiated, performed, cancelled or become overdue. The work list can also include a list of switching orders to execute, a list of permits that need to be issued, a list of crew dispatches that need to be sent a notification, a list of interruptions that are pending completion, etc. Also, the work plan component 116 can provide for integration functionalities, such as but not limited to integration with different components of the management component 102 (e.g., tasks can be initiated from any other component of the management component 102 whenever follow up and later actions are required, tasks can provide access to the other component of the management component 102, etc.), integration with external workflow applications (e.g., tasks can be initiated in external workflow applications and added to an operator work plan, the external workflow applications can be notified upon completion of the task in the operator work plan, etc.).

The integration component 118 can manage integration services associated with one or more systems. For example, the integration component 118 can be configured to capture data from external systems, receive data from external systems, initiate processes associated with the electrical energy distribution system, and/or manage work initiated in external systems. In an aspect, the integration component 118 can manage integration of each component included in the management component 102 with external systems and/or to provide electronic visibility to external systems. In one example, the integration component 118 can provide a framework for verified templates and/or samples that support features, such as but not limited to, web services, web clients, extract, transform load (ETL) transfers, data bus access and/or transaction logs.

In certain implementations, the management component 102 can facilitate solving specific operational, integration and/or workflow problems associated with the electrical energy distribution system. The management component 102 can provide common core features and/or functions for all applications associated with the management component 102. The features can include, but are not limited to, data model, access control, state management, configuration, notifications, user interfaces, attachments, reporting, data translation, audit log and/or archiving. The data model feature can provide management and/or integration of an equipment common model. The access control feature can provide definition and/or management of areas of responsibility, roles, permissions and/or user management. The state management feature can implement a collection of template process and/or life cycle states to manage lifecycle of each action associated with the electrical energy distribution system. The configuration feature can be a definition of the data fields, data validation rules, valid actions, checklists and/or state transitions for each object type and each object state. The notifications feature can provide notifications to users and/or stakeholders to notify users and/or stakeholders on status changes and/or new or completed tasks in the system. The user interface feature can provide a common and integrated user interface, single sign-on and access across the web for external parties and/or integration into an operator console. The attachments feature can provide support for attachments to capture evidence, references to external system records, uniform resource locators (URLs) to external systems and/or databases. The reporting feature can provide definition, execution, distribution and access to reports across all the modules, equipment types, area of responsibility and operator functions. Furthermore, the management component 102 can facilitate analysis of business operation data and/or can provide view summaries across equipment types, network areas, and areas of responsibility. The reporting feature can also be employed to generate detail reports and/or signed paper copies that can be distributed to personnel. The data translation feature can provide integration adapters for data translation and/or data transformation to facilitate data capture and/or data integration. The audit log feature can provide auditing and/or logging of actions associated with electrical energy distribution system. The audit log feature can also provide auditing and/or logging of data changes, state changes, inbound communications, outbound communications, etc. The archiving feature can maintain online records for a certain period of time (e.g., a twelve month rolling period, etc.) and/or can automatically move cancelled, completed or rejected transactions to an archiving database.

Furthermore, the management component 102 can facilitate display of data associated with the electrical energy distribution system and/or process data associated with external systems and/or internal systems. The management component 102 can also be integrated with training simulator environments (e.g., so that training and/or storm drills can be realistically performed, to verify that operational workflow is able to support emergencies, etc.). As such, the management component 102 can facilitate identifying and/or correcting errors and/or bottlenecks associated with the electrical energy distribution system. The management component 102 can also facilitate testing changes to the electrical energy distribution system in a simulated environment rather than in the actual electrical energy distribution environment.

Accordingly, collaborative outage and switch management can be provided for coordination and/or visibility among various entities that perform different activities and/or tasks associated with an electrical energy distribution system. Different activities and/or tasks can include and/or be associated with, but is not limited to, planning, construction, expansion, maintenance, repairs, normal system operations, outage, emergency response, collection, validation, maintenance and/or auditing of information required to analyze, approve, implement and/or complete a request. Collaborative outage and switch management can also be associated with a collaborative process for requests, study, analysis, approval, and verifications that are adhered to at each step of a process associated with managing outages and/or switching operations. As such, it can be verified that all personal involved in a request for an outage and/or a switching operation is properly trained and/or has clearance to perform a required task. Moreover, collaborative outage and switch management can include management of permits, adherence to safety practices, and/or implementation, tracking, automation and/or auditing of switching operations.

Figure 2:
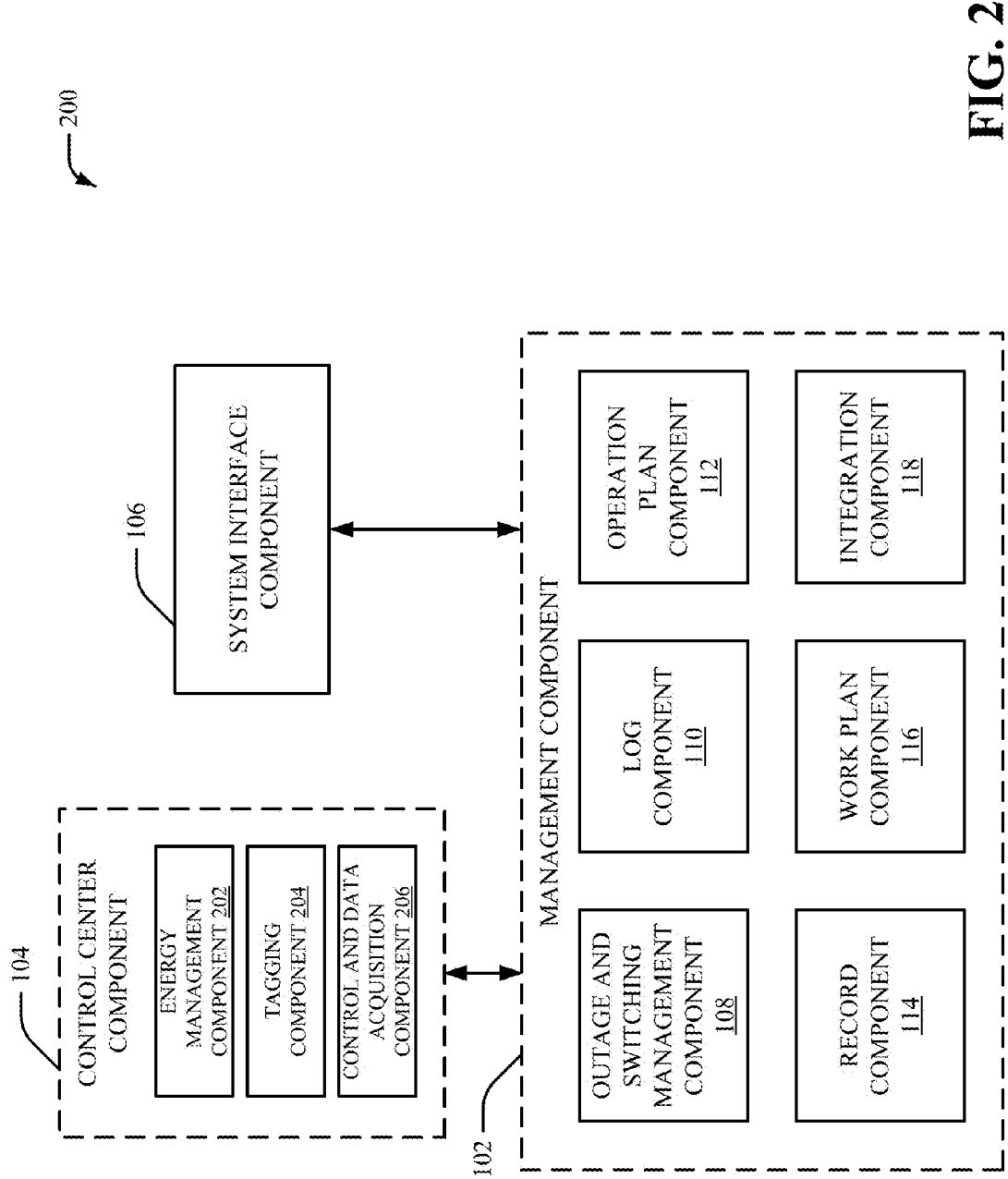
FIG. 2 is an illustration of another system in accordance with aspects of the subject disclosure.

FIG. 2 is a diagram of an example system 200 in accordance with aspects of the subject disclosure. System 200 can include the management component 102, the control center component 104 and the system interface component 106. The management component 102 can include the outage and switching management component 108, the log component 110, the operation plan component 112, the record component 114, the work plan component 116 and/or the integration component 118. The control center component 104 can include an energy management component 202, a tagging component 204 and/or a control and data acquisition component 206.

Information associated with the energy management component 202, the tagging component 204 and/or the control and data acquisition component 206 can be employed by the management component 102 to facilitate managing the electrical energy distribution system. In one example, information associated with the energy management component 202, the tagging component 204 and/or the control and data acquisition component 206 can be employed by the outage and switching management component 108 to facilitate managing outages and/or switching operations associated with the electrical energy distribution system The energy management component 202 can be an energy management feature of the control center component 104 and/or can be associated with energy management information (e.g., EMS information). In an aspect, the management component 102 can employ the energy management component 202 to ensure correct equipment selection and/or eliminate potentials errors and miscommunication. In another aspect, the energy management component 202 can be associated with EMS authorizations and/or permits. The energy management component 202 can also be associated with advanced network analysis applications and/or multiple time point network analysis applications. The energy management component 202 can share a common model with an EMS system, including but not limited to, equipment and/or SCADA.

The tagging component 204 can be a tagging feature of the control center component 104 and/or can be associated with tagging information. The tagging component 204 can be integrated with the outage and switching management component 108 to facilitate generation of tags. For example, the outage and switching management component 108 can employ information associated with the tagging component 204 to generate a tag for a device (e.g., equipment) associated with an outage and/or a switching operation. The tagging component 204 can be integrated with the outage and switching management component 108 to ensure proper equipment locking and/or to eliminate potential errors and safety issues associated with an outage and/or a switching operation for the electrical energy distribution system. Furthermore, the tagging component 204 can be integrated with the outage and switching management component 108 to facilitate an auto-populated tag feature (e.g., add/remove tag, open/close a switch and tag, etc).

The control and data acquisition component 206 can be a control and data acquisition feature of the control center component 104 and/or can be associated with control and data acquisition information. The control and data acquisition component 206 can be associated with a SCADA system. For example, the control and data acquisition component 206 can be associated with coded signals that provide control of equipment in the electrical energy distribution system. In another example, the control and data acquisition component 206 can be associated with control system information associated with the electrical energy distribution system. The control and data acquisition component 206 can be integrated with the outage and switching management component 108 to facilitate automatic switching of a device (e.g., equipment) in the electrical energy distribution system. For example, the control and data acquisition component 206 can be integrated with the outage and switching management component 108 to facilitate automatic SCADA control to open/close controlled switching associated with the electrical energy distribution system. The control and data acquisition component 206 can also be integrated with the outage and switching management component 108 to ensure proper equipment operation and/or to eliminate potential errors and safety issues. Provides for recording of manual switching operations.

Figure 3:
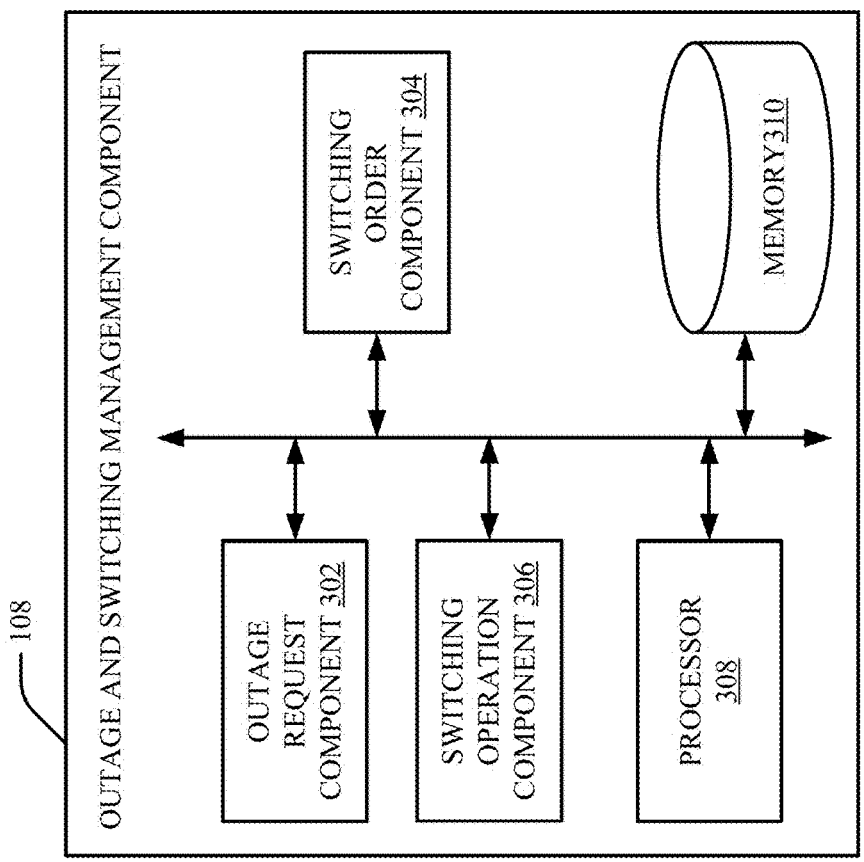
FIG. 3 a high-level block diagram of an example outage and switching management component in accordance with aspects of the subject disclosure.

FIG. 3 is a diagram of an example outage and switching management component 108 in accordance with aspects of the subject disclosure. In FIG. 3, the outage and switching management component 108 includes an outage request component 302, a switching order request component 304 and a switching operation component 306. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. System 300 can include memory 310 for storing computer executable components and instructions. System 300 can further include a processor 308 to facilitate operation of the instructions (e.g., computer executable components and instructions) by system 300.

The outage request component 302 can receive a request to interrupt electrical power provided to a portion of an electrical energy distribution system (e.g., a power grid system). For example, the outage request component 302 can receive outage request information related to a request to interrupt power (e.g., a power supply) provided to a device (e.g., equipment) in an electrical energy distribution system. The outage request information can include information associated with an outage request, such as but not limited to, scheduling information associated with the switching operation to de-energize the portion of the electrical energy distribution system, information associated with the control center component 104 (e.g., the energy management component 202, the tagging component 204 and/or the control and data acquisition component 206), information associated with the system interface component 106 and/or information associated with other components of the management component 102 (e.g., the log component 110, the operation plan component 112, the record component 114, the work plan component 116 and/or the integration component 118), as more fully disclosed herein.

The switching order request component 304 can determine (e.g., generate) switching information related to a set of steps to de-energize the portion of the electrical energy distribution system (e.g., the portion of the electrical energy distribution system associated with the device) based on the request (e.g., the outage request information). For example, the switching order request component 304 can determine a set of actions associated with the electrical energy distribution system based on the request (e.g., the outage request information). In an aspect, the switching information can comprise safety clearance information related to the set of steps to de-energize the portion of the electrical energy distribution system. Additionally or alternatively, the switching information can comprise other information related to the set of steps to de-energize the portion of the electrical energy distribution system, such as but not limited to, information associated with the control center component 104 (e.g., the energy management component 202, the tagging component 204 and/or the control and data acquisition component 206), information associated with the system interface component 106 and/or information associated with other components of the management component 102 (e.g., the log component 110, the operation plan component 112, the record component 114, the work plan component 116 and/or the integration component 118), as more fully disclosed herein.

The switching operation component 306 can perform a switching operation to de-energize the portion of the electrical energy distribution system based on the switching information. For example, the switching operation can be an operation to open one or more switches associated with the electrical energy distribution system. In an aspect, the switching operation component 306 can perform a switching operation to interrupt the electrical power provided to the portion of the electrical energy distribution system in response to a determination that the set of actions are performed. The switching operation can be an operation to disconnect one or more transmission lines and/or one or more system components associated with the device. In certain implementations, the switching operation component 306 can generate a notification related to status of the electrical energy distribution system in response to the switching operation.

Additionally, the outage request component 302 can receive a different request to re-establish electrical power provided to a portion of an electrical energy distribution system (e.g., a power grid system). For example, the outage request component 302 can receive different request information related to a request to restore power (e.g., a power supply) provided to the device (e.g., the equipment) in the electrical energy distribution system. Therefore, the switching order request component 304 can determine (e.g., generate) different switching information related to a different set of steps to energize the portion of the electrical energy distribution system (e.g., the portion of the electrical energy distribution system associated with the device) based on the different request (e.g., the different request information). For example, the switching order request component 304 can determine a different set of actions associated with the electrical energy distribution system based on the different request (e.g., the different request information). Moreover, the switching operation component 306 can perform a different switching operation to energize the portion of the electrical energy distribution system based on the different switching information. For example, the switching operation can be an operation to close one or more switches associated with the electrical energy distribution system. In an aspect, the switching operation component 306 can perform a different switching operation to restore the electrical power provided to the portion of the electrical energy distribution system in response to a determination that the different set of actions are performed.

Figure 4:
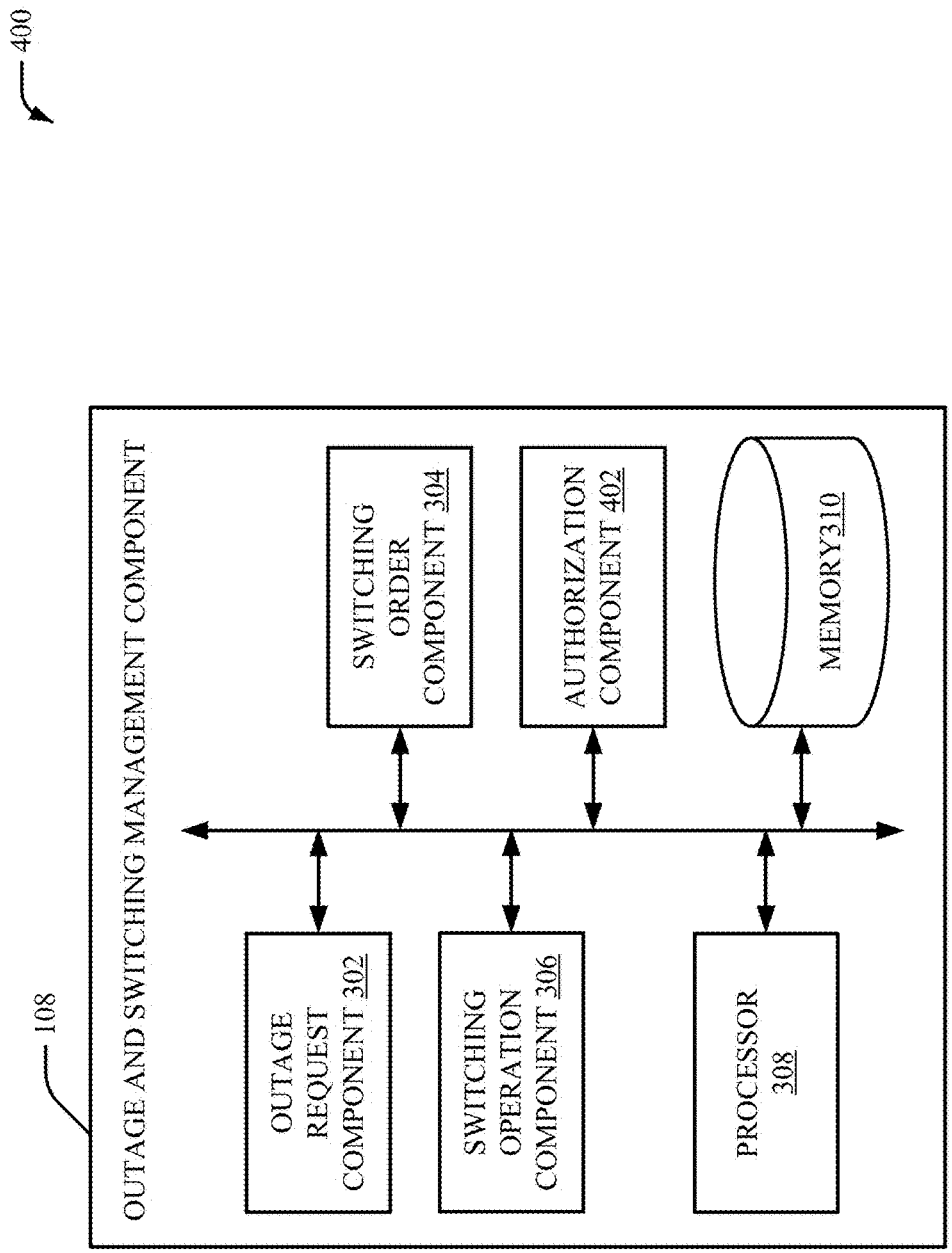
FIG. 4 a high-level block diagram of another example outage and switching management component in accordance with aspects of the subject disclosure.

FIG. 4 is a diagram of another example outage and switching management component 108 in accordance with aspects of the subject disclosure. In FIG. 4, the outage and switching management component 108 includes the outage request component 302, the switching order request component 304, the switching operation component 306 and an authorization component 402.

The authorization component 402 can manage authorizations (e.g., permits) related to a set of steps (e.g., a set of actions) to de-energize or energize a portion of the electrical energy distribution system. The authorization component 402 can generate (e.g., issue) one or more authorizations related to a set of steps (e.g., a set of actions) to de-energize the portion of the electrical energy distribution system. For example, the authorization component 402 can generate (e.g., issue) one or more permits associated with the switching operation. Additionally or alternatively, the authorization component 402 can generate a request for one or more authorizations related to a set of steps (e.g., a set of actions) to de-energize the portion of the electrical energy distribution system. The authorization component 402 can also remove (e.g., close) one or more authorizations related to a set of steps (e.g., a set of actions) to de-energize the portion of the electrical energy distribution system. Additionally or alternatively, the authorization component 402 can transfer one or more authorizations related to a set of steps (e.g., a set of actions) to de-energize the portion of the electrical energy distribution system. Similarly, authorization component 402 can generate (e.g., issue), request and/or transfer one or more authorizations related to a set of steps (e.g., a set of actions) to energize the portion of the electrical energy distribution system. In an aspect, authorization component 402 can manage authorizations (e.g., permits) related to a set of steps (e.g., a set of actions) to de-energize or energize a portion of the electrical energy distribution system based on information, such as but not limited to, information associated with the control center component 104 (e.g., the energy management component 202, the tagging component 204 and/or the control and data acquisition component 206), information associated with the system interface component 106 and/or information associated with other components of the management component 102 (e.g., the log component 110, the operation plan component 112, the record component 114, the work plan component 116 and/or the integration component 118), as more fully disclosed herein.

Figure 5:
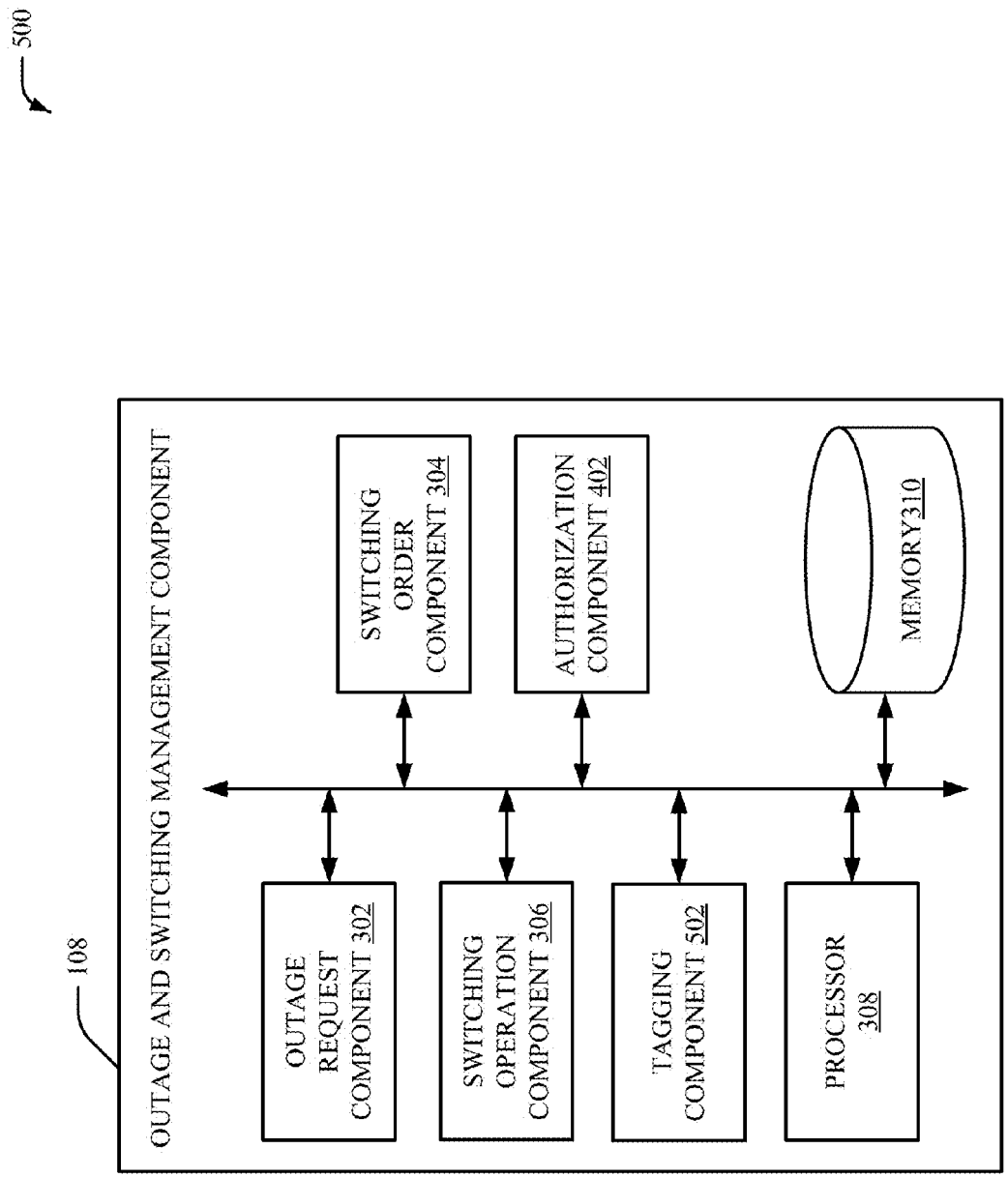
FIG. 5 a high-level block diagram of yet another example outage and switching management component in accordance with aspects of the subject disclosure.

FIG. 5 is a diagram of yet another example outage and switching management component 108 in accordance with aspects of the subject disclosure. In FIG. 5, the outage and switching management component 108 includes the outage request component 302, the switching order request component 304, the switching operation component 306, the authorization component 402 and a tagging component 502.

The tagging component 502 can manage tag information association with a device (e.g., equipment) associated with a switching operation. In an aspect, the tagging component 502 can generate tag information association with a device included in the electrical energy distribution system in response to a switching operation associated with the device. For example, the tag information can include a tag (e.g., an identifier) associated with a device and/or a status of a device in response to the switching operation. The tagging component 502 can manage the tag information based on information associated with the tagging component 204 of the control center component 104. For example, the tagging component 502 can employ information associated with the tagging component 204 to generate a tag for a device (e.g., equipment) associated with an outage and/or a switching operation. The tagging information can facilitate proper device locking and/or can eliminate potential errors and safety issues associated with an outage and/or a switching operation for the electrical energy distribution system. In an aspect, the tagging component 502 can generate tag information association with a device in the electrical energy distribution system based on information, such as but not limited to, information associated with the control center component 104 (e.g., the energy management component 202, the tagging component 204 and/or the control and data acquisition component 206), information associated with the system interface component 106 and/or information associated with other components of the management component 102 (e.g., the log component 110, the operation plan component 112, the record component 114, the work plan component 116 and/or the integration component 118), as more fully disclosed herein.

Figure 6:
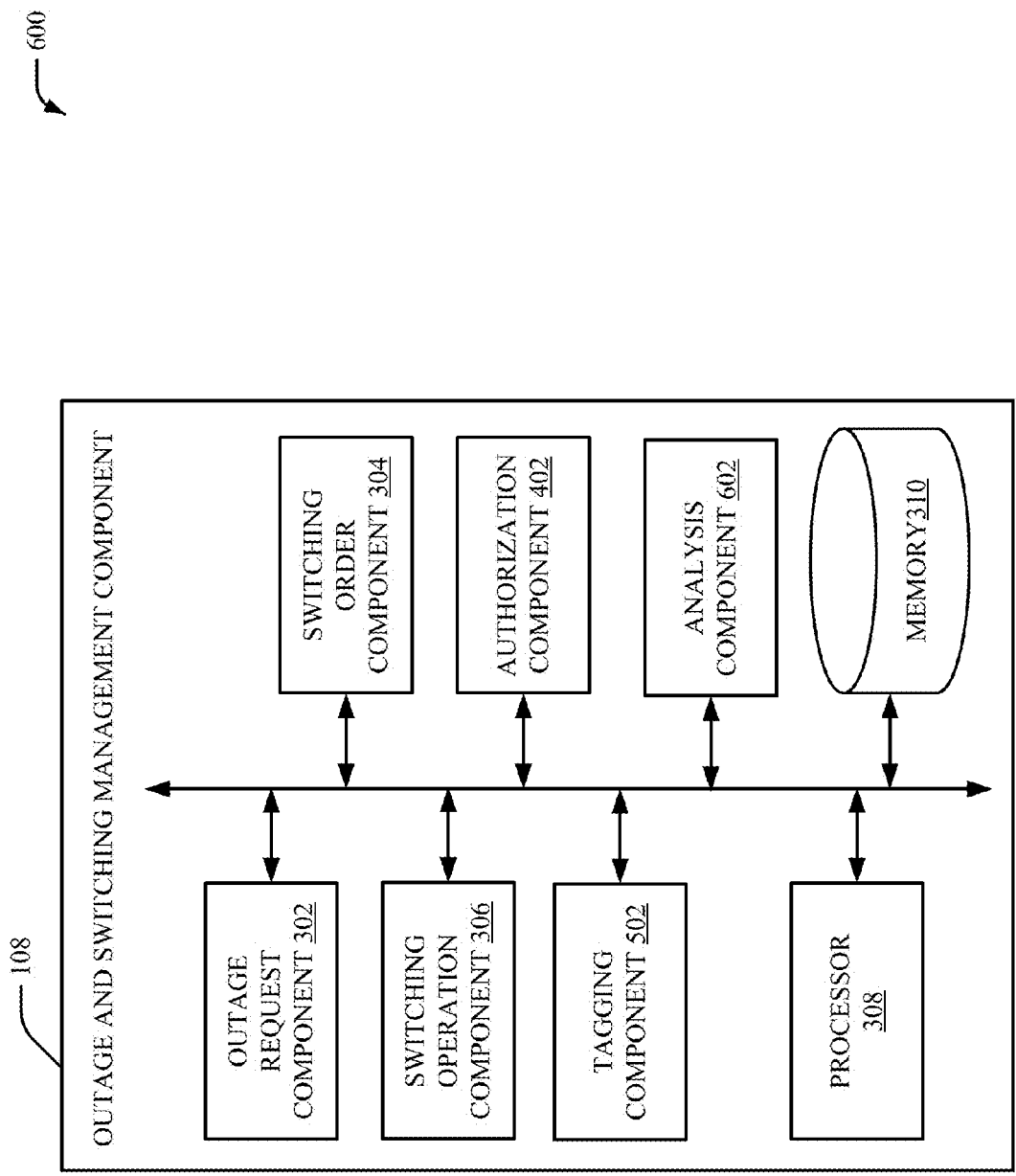
FIG. 6 a high-level block diagram of yet another example outage and switching management component in accordance with aspects of the subject disclosure.

FIG. 6 is a diagram of yet another example outage and switching management component 108 in accordance with aspects of the subject disclosure. In FIG. 6, the outage and switching management component 108 includes the outage request component 302, the switching order request component 304, the switching operation component 306, the authorization component 402, the tagging component 502 and analysis component 602.

The analysis component 602 can capture measurement data associated with the portion of the electrical energy distribution system in response to the switching operation. Additionally, the analysis component 602 can analyze the measurement data to identify changes to the electrical energy distribution system in response an outage and/or a switching operation. In an aspect, the analysis component 602 can identify another device in the electrical energy distribution system (e.g., a secondary device) that is provided a different amount of power in response to the switching operation. In an aspect, the analysis component 602 can identify device in the electrical energy distribution system (e.g., a secondary device) that is associated with different operation limits in response to the switching operation. To facilitate analysis of the electrical energy distribution system in response an outage and/or a switching operation, the analysis component 602 can analyze power flows throughout the electrical energy distribution system, monitor alarms, obtain and/or analyze measurement data (e.g., associated with a synchrophasor and/or another measuring device), monitor relay data, monitor oscillation data and/or analyze other data associated with the electrical energy distribution system. In another aspect, the analysis component 602 can perform analysis of the electrical energy distribution system in response an outage and/or a switching operation (e.g., analysis associated with an outage and/or a switching operation of the electrical energy distribution system) based on information, such as but not limited to, information associated with the control center component 104 (e.g., the energy management component 202, the tagging component 204 and/or the control and data acquisition component 206), information associated with the system interface component 106 and/or information associated with other components of the management component 102 (e.g., the log component 110, the operation plan component 112, the record component 114, the work plan component 116 and/or the integration component 118), as more fully disclosed herein.

While FIGS. 1-6 depict separate components in system 100, 200, 300, 400, 500 and 600, it is to be appreciated that the components may be implemented in a common component. Further, it can be appreciated that the design of system 100, 200, 300, 400, 500 and/or 600 can include other component selections, component placements, etc., to facilitate managing outages and/or switching operations associated with an electrical energy distribution system (e.g., a power grid system).

Figure 7:
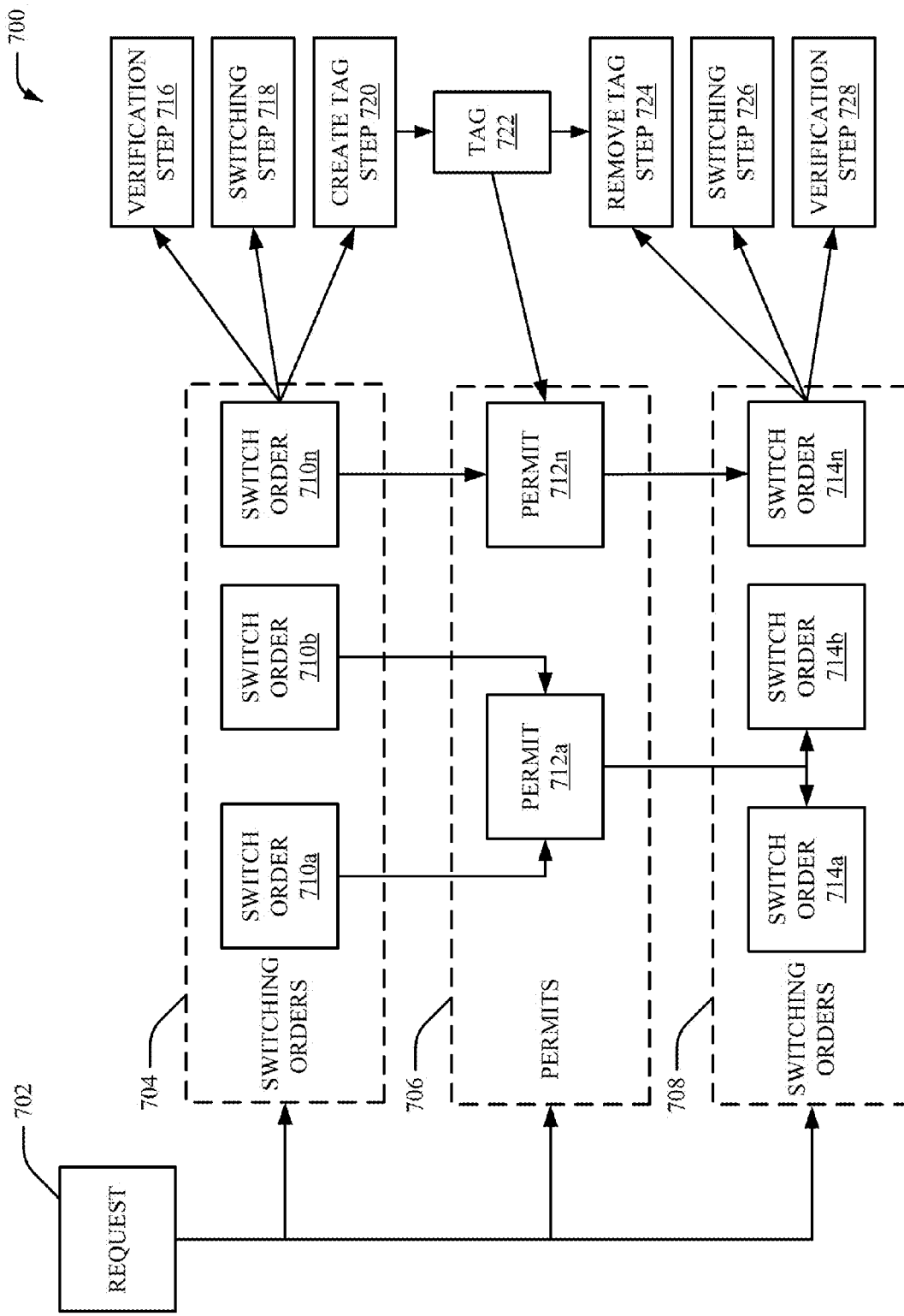
FIG. 7 illustrates a diagram of an example outage and switching management process in accordance with aspects of the subject disclosure.

FIG. 7 is a diagram of an example outage and switching management process 700 in accordance with aspects of the subject disclosure. In FIG. 7, a request 702 can be received (e.g., by the outage request component 302). The request 702 can be a request (e.g., an outage request) to interrupt electrical power provided to a portion of an electrical energy distribution system (e.g., a power grid system). Alternatively, the request 702 can be a request to restore electrical power provided to a portion of an electrical energy distribution system (e.g., a power grid system). The request 702 can initiate an outage and switching management process associated with the outage and switching management component 108. The outage and switching management component 108 can generate, verify, approve and/or analyze the request 702. In one example, the request 702 can include scheduling information associated with an equipment outage. Therefore, the outage and switching management component 108 can also schedule an equipment outage request associated with the request 702. The outage and switching management component 108 can manage processes and/or notifications for the status of an outage associated with the request 702. The outage and switching management component 108 can also manage tracking and/or auditing of changes associated with the electrical energy distribution system (e.g., the power grid system) in response to the request 702.

In response to receiving the request 702, a step 704, a step 706 and/or a step 708 can be initiated. For example, if the request 702 is a request (e.g., an outage request) to interrupt electrical power provided to a portion of an electrical energy distribution system, the step 704 and/or the step 706 can be initiated. Alternatively, if the request 702 is a request to restore electrical power provided to a portion of an electrical energy distribution system, the step 708 and/or the step 706 can be initiated.

At the step 704, one or more switch orders 710a-n can be generated. For example, each of the one or more switch orders 710a-n can be associated with one or more steps (e.g., one or more actions, one or more switching steps, etc.) to de-energize a portion of the electrical energy distribution system associated with the request 702. In one example, a switch order from the one or more switch orders 710a-n can be associated with one or more steps to plan, define, organize, verify, communicate and execute the de-energizing of the portion of the electrical energy distribution system associated with the request 702. In another example, a switch order from the one or more switch orders 710a-n can establish safety clearance to de-energize the portion of the electrical energy distribution system associated with the request 702. In yet another example, a switch order from the one or more switch orders 710a-n can be associated with a selection of an operator (e.g., a switchman) based on switching qualifications and/or training of the operator.

At the step 706, one or more permits 712a-n can be generated. For example, the permit 712a can be generated based on a first switch order 710a and a second switch order 710b. In another example, the permit 712n can be generated based on a single switch order 710n. The one or more permits 712a-n can be authorizations to de-energize the portion of the electrical energy distribution system associated with the request 702.

At step 708, one or more switch orders 714a-n can be generated. For example, each of the one or more switch orders 714a-n can be associated with one or more steps (e.g., one or more actions, one or more switching steps, etc.) to energize (e.g., restore power to) the portion of the electrical energy distribution system associated with the request 702. In one example, a switch order from the one or more switch orders 714a-n can be associated with one or more steps to plan, define, organize, verify, communicate and execute the energizing of the portion of the electrical energy distribution system associated with the request 702. In another example, a switch order from the one or more switch orders 714a-n can establish safety clearance to energize the portion of the electrical energy distribution system associated with the request 702. In yet another example, a switch order from the one or more switch orders 714a-n can be associated with a selection of an operator (e.g., a switchman) based on switching qualifications and/or training of the operator. The one or more switch orders 714a-n can be associated with the one or more permits 712a-n and/or the one or more switch orders 710a-n. For example, a first switch order 714a and a second switch order 714b can be associated with the permit 712a. In another example, a single switch order 714n can be associated with the permit 712n.

After the step 704, a verification step 716, a switching step 718 and/or a create tag step 720 can be performed. At the verification step 716, the request 702 and/or the one or more switching orders 710a-n can be verified. At the switching step 718, a switching operation associated with the request 702 can be performed. For example, one or more switches included in the electrical energy distribution system (e.g., the power grid system) can be opened. At the create tag step 720, a tag (e.g., an identifier) for a device (e.g., equipment) and/or the portion of an electrical energy distribution system that is de-energized in response to the switching step 718 can be generated. For example, the create tag step 720 can generate a tag 722. The tag 722 can be associated with one or more of the permits 712a-n. In one example, the tag 722 can be an equipment information tag.

After the step 708, a remove tag step 724, a switching step 726 and/or a verification step 728 can be performed. At the remove tag step 724, the tag 722 created for the device (e.g., the equipment) and/or the portion of the electrical energy distribution system can be removed. At the switching step 726, a different switching operation associated with the request 702 can be performed. For example, the one or more switches included in the electrical energy distribution system (e.g., the power grid system) can be closed. At the verification step 728, the request 702 and/or the one or more switching orders 714a-n can be verified.

Figure 8:
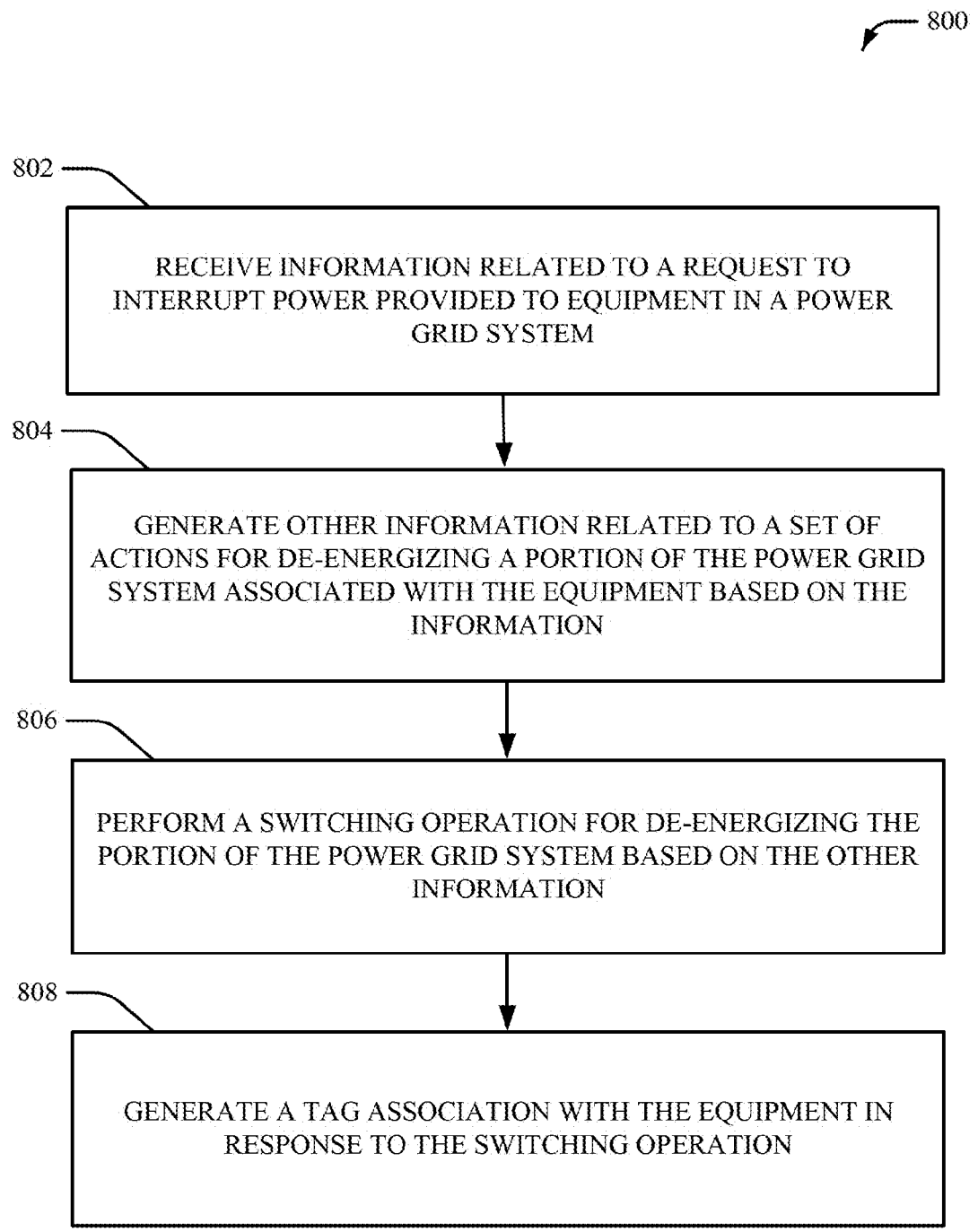
FIG. 8 illustrates a method for managing outages and/or switching operations associated with a power grid system in accordance with aspects of the subject disclosure.
Figure 9:
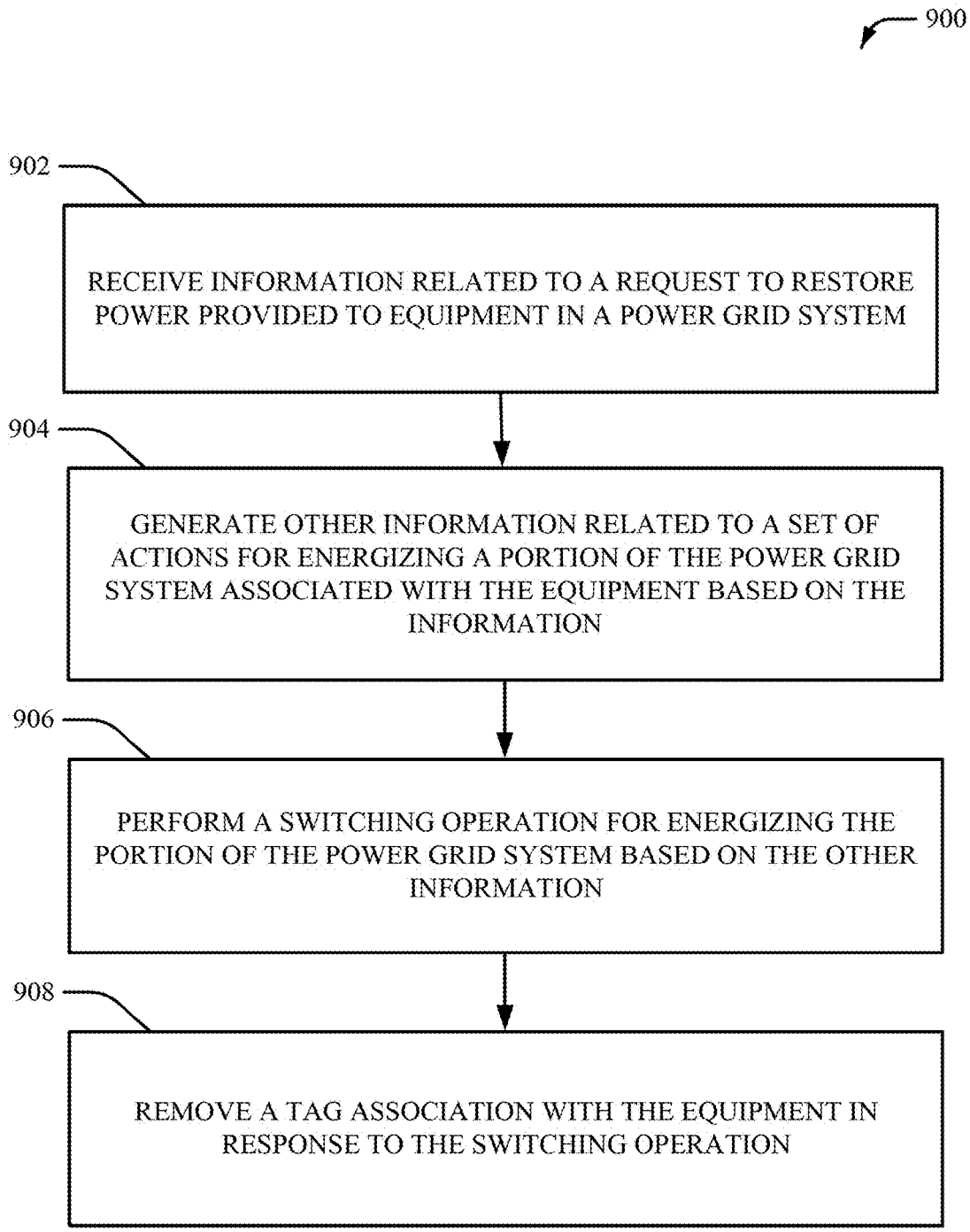
FIG. 9 illustrates another method for managing outages and/or switching operations associated with a power grid system in accordance with aspects of the subject disclosure.
Figure 10:
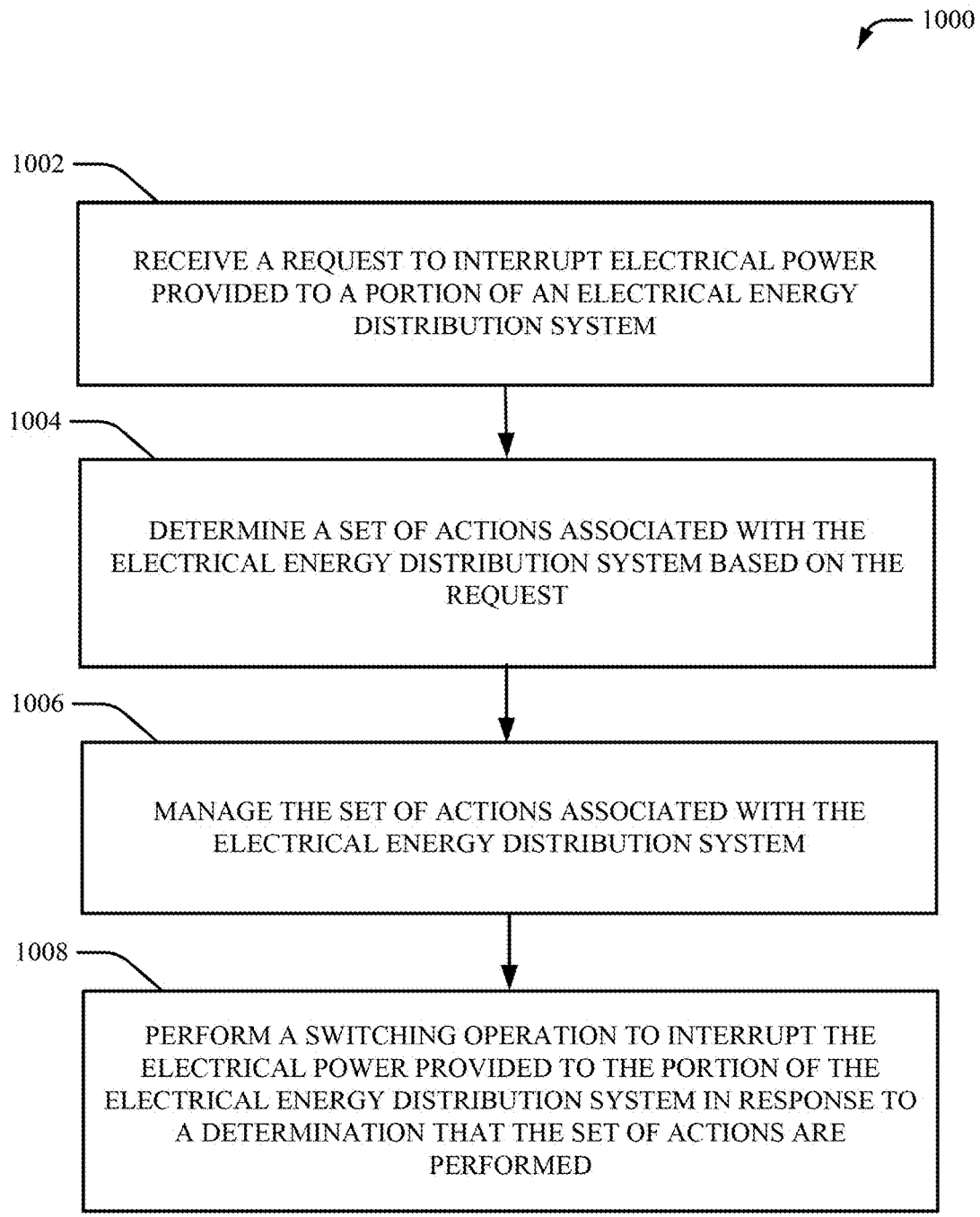
FIG. 10 illustrates yet another method for managing outages and/or switching operations associated with a power grid system in accordance with aspects of the subject disclosure.

In view of the example system(s) described above, example method(s) that can be implemented in accordance with the disclosed subject matter can be better appreciated with reference to flowcharts in FIGS. 8-10. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 8 illustrates a methodology 800 for managing outages and/or switching operations associated with a power grid system, according to an aspect of the subject innovation. At 802, information related to a request to interrupt power provided to equipment in a power grid system is received. For example, the request can be a request (e.g., an outage request) to de-energize a portion of the power grid system associated with the equipment (e.g., one or more devices). The information can include, but is not limited to, scheduling information, timestamp information, power grid location information and/or other information associated with the request to interrupt power provided to the equipment in the power grid system.

At 804, other information related to a set of actions for de-energizing a portion of the power grid system associated with the equipment is generated based on the information. For example, the set of actions can be a set of actions (e.g., a set of tasks) associated with the power grid system to facilitate interrupting power provided to equipment (e.g., one or more devices) included in the power grid system. The set of actions can also be generated based on energy management information, distribution management information, control information, data acquisition information, power grid network information, and/or other information associated with a control center system. Additionally or alternatively, set of actions can be generated based on information included in data logs, operation plans, records and/or work plans associated with the power grid system.

At 806, a switching operation for de-energizing the portion of the power grid system is performed based on the other information. For example, one or more switches in the power grid system that are associated with the equipment can be opened. In one example, one or more transmission lines associated with the equipment can be disconnected. At 808, a tag association with the equipment is generated in response to the switching operation. For example, the tag can be associated with the equipment and/or the switching operation. The tag can be an identifier that identifies the equipment that is disconnected from the power grid system. The tag can also include other information associated with the equipment and/or the portion of the power grid system that is de-energized in response to the switching operation.

FIG. 9 illustrates a methodology 900 for managing outages and/or switching operations associated with a power grid system, according to another aspect of the subject innovation. In an aspect, the methodology 900 can be implemented in connection with the methodology 800. At 902, information related to a request to restore power provided to equipment in a power grid system is received. For example, the request can be a request to energize a portion of the power grid system associated with the equipment (e.g., one or more devices). The information can include, but is not limited to, scheduling information, timestamp information, power grid location information and/or other information associated with the request to restore power provided to the equipment in the power grid system.

At 904, other information related to a set of actions for energizing a portion of the power grid system associated with the equipment is generated based on the information. For example, the set of actions can be a set of actions (e.g., a set of tasks) associated with the power grid system to facilitate restoring power provided to equipment (e.g., one or more devices) included in the power grid system. The set of actions can also be generated based on energy management information, distribution management information, control information, data acquisition information, power grid network information, and/or other information associated with a control center system. Additionally or alternatively, set of actions can be generated based on information included in data logs, operation plans, records and/or work plans associated with the power grid system.

At 906, a switching operation for energizing the portion of the power grid system is performed based on the other information. For example, one or more switches in the power grid system that are associated with the equipment can be closed. In one example, one or more transmission lines associated with the equipment can be re-connected. At 908, a tag association with the equipment is removed in response to the switching operation. For example, the removed tag can be associated with the equipment and/or the switching operation.

FIG. 10 illustrates a methodology 1000 for managing outages and/or switching operations associated with a power grid system, according to yet another aspect of the subject innovation. At 1002, a request to interrupt electrical power provided to a portion of an electrical energy distribution system is received. At 1004, a set of actions associated with the electrical energy distribution system are determined based on the request. At 1006, the set of actions associated with the electrical energy distribution system are managed. For example, notifications associated with the set of actions can be generated, a data log associated with the set of actions can be generated and/or managed, an operation plan can be generated based on the set of actions, a work plan can be generated based on the set of actions, completion of the set of actions can be monitored, characteristics of the electrical energy distribution system can be monitored in response to the set of actions, other information associated with the electrical energy distribution system can be monitored and/or managed in response to the set of actions, etc. At 1008, a switching operation to interrupt the electrical power provided to the portion of the electrical energy distribution system is performed in response to a determination that the set of actions are performed. For example, a switching operation to interrupt the electrical power provided to the portion of the electrical energy distribution system is performed in response to a determination that the set of actions are successfully completed.

Figure 11:
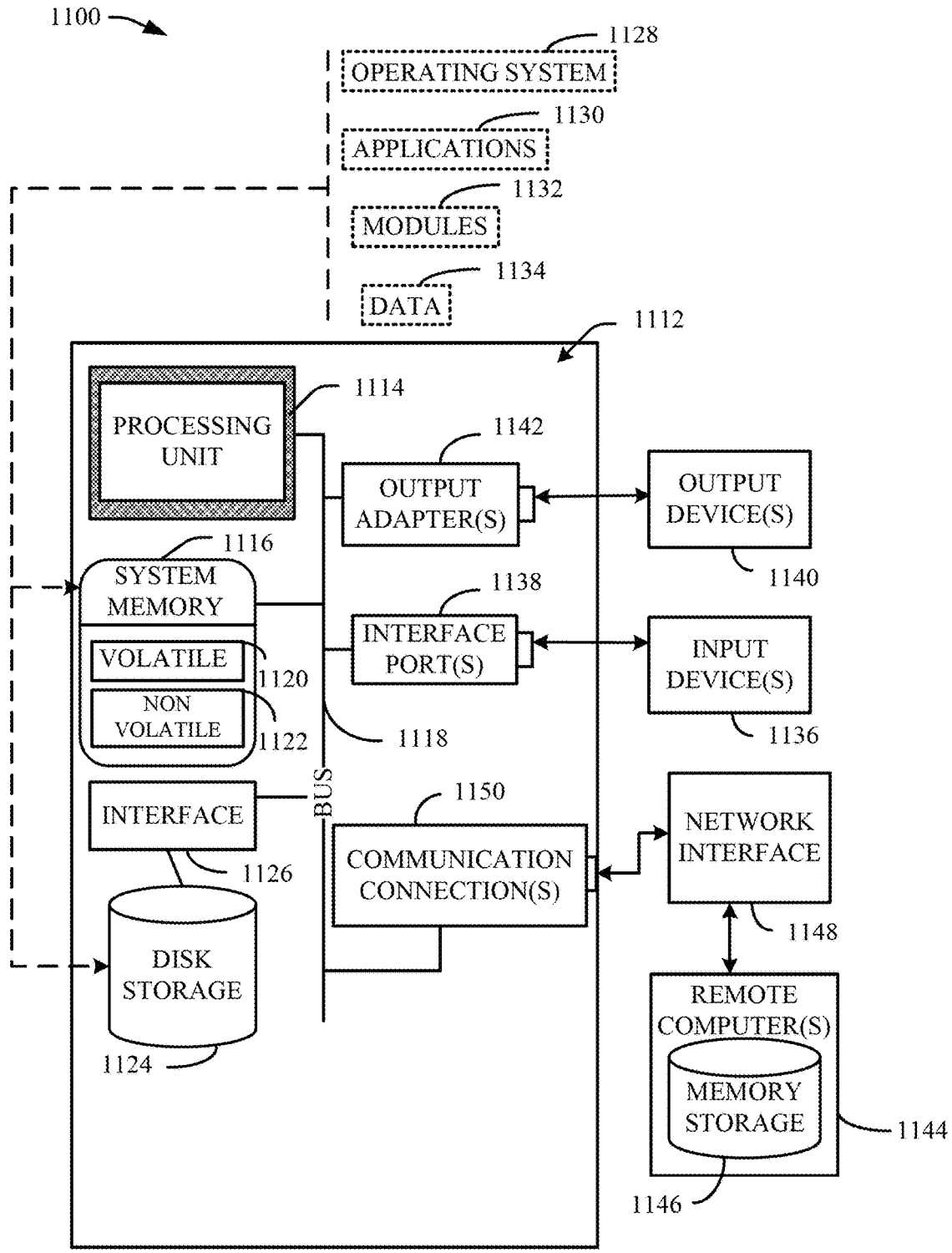
FIG. 11 is a schematic block diagram illustrating a suitable operating environment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112 includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1116 can include volatile memory 1120 and nonvolatile memory 1122. A basic input/output system, containing routines to transfer information between elements within computer 1112, such as during start-up, can be stored in nonvolatile memory 1122. By way of illustration, and not limitation, nonvolatile memory 1122 can include read only memory, programmable read only memory, electrically programmable read only memory, electrically erasable read only memory, or flash memory. Volatile memory 1120 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, a user interface can be embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus, an infrared port, a Bluetooth port, an IP port, or a logical port associated with a wireless service, etc. Output device(s) 1140 use some of the same type of ports as input device(s) 1136.

Thus, for example, a universal serial busport can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and digital subscriber line modems, integrated services digital network adapters, and Ethernet cards.

Figure 12:
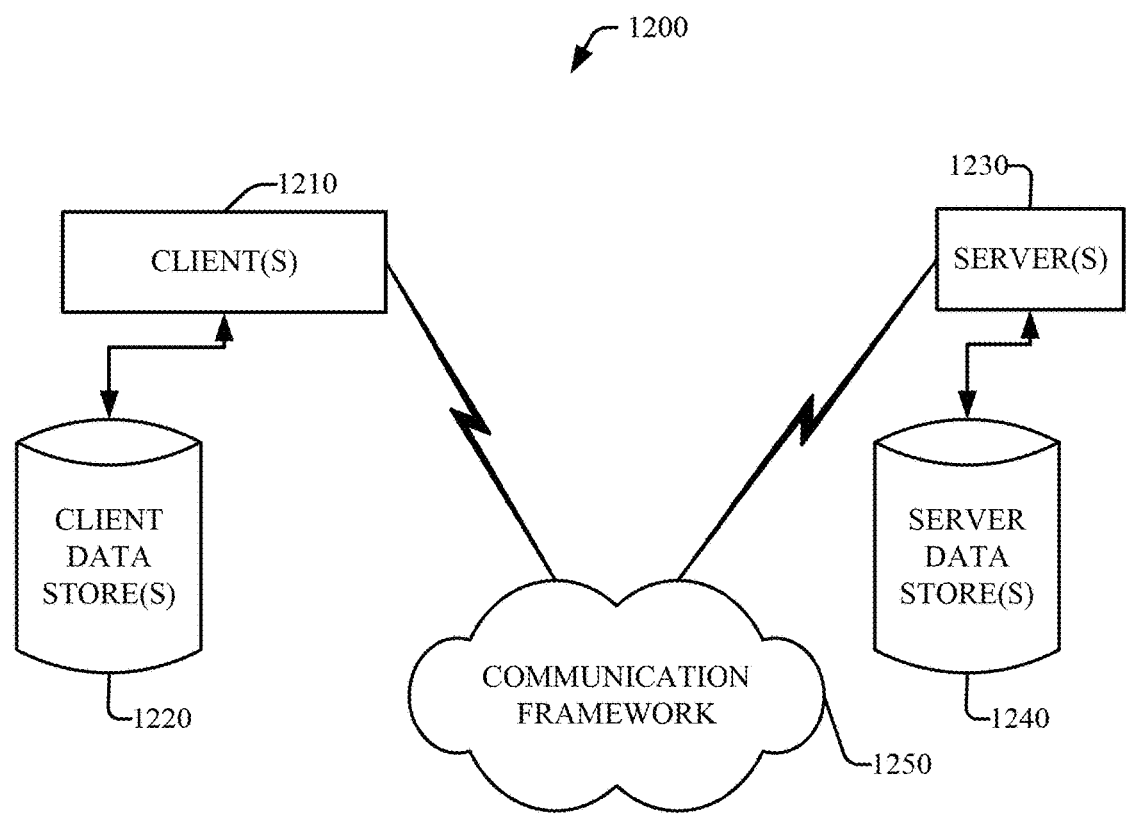
FIG. 12 is a schematic block diagram of a sample-computing environment.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

Figure 13:
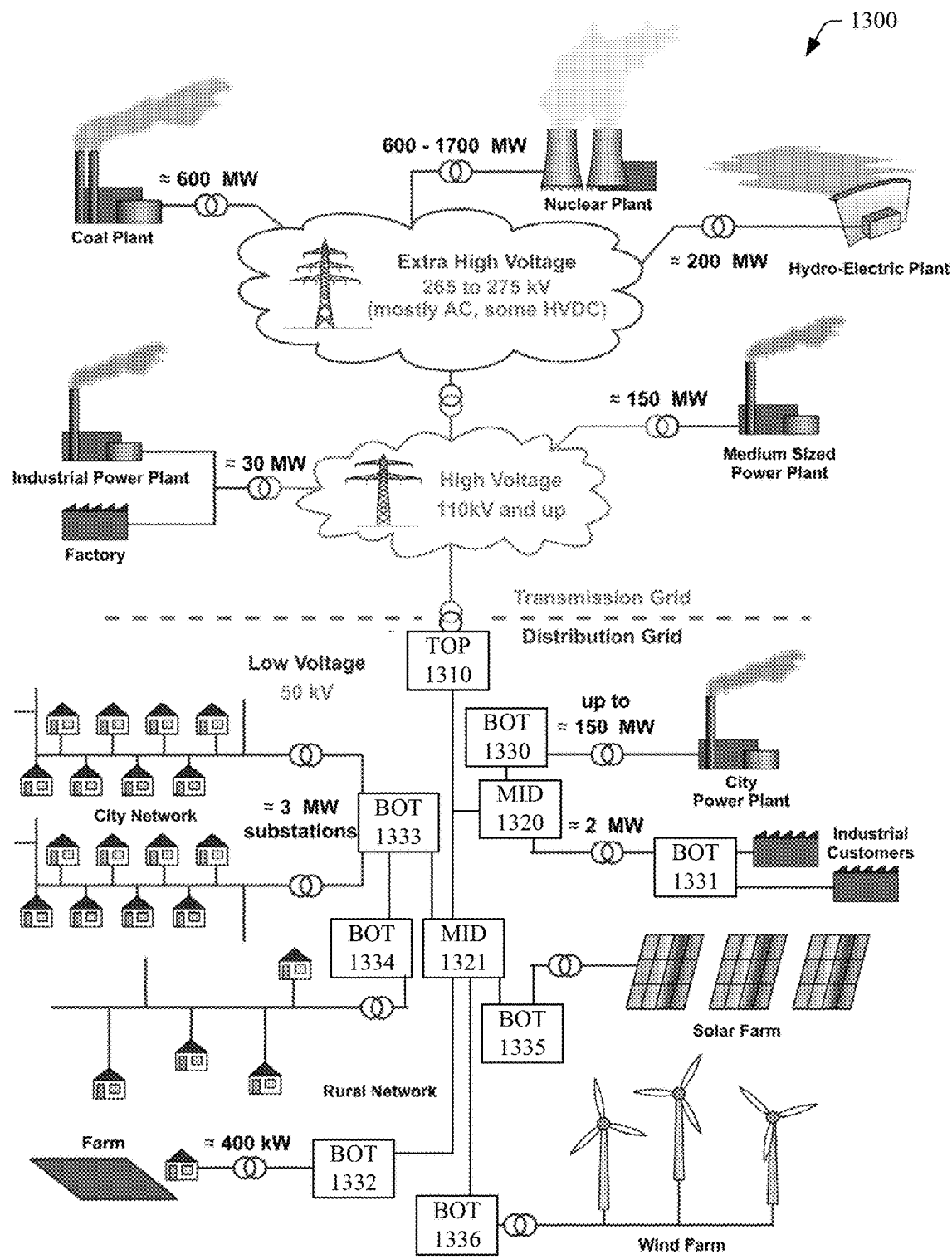
FIG. 13 depicts a diagram of an example electrical grid environment in which the various aspects of the disclosed subject matter can be practiced.

FIG. 13 depicts a diagram of an example electrical grid environment 1300 in which the various aspects of the disclosed subject matter can be practiced. It is to be appreciated that this figure and the associated disclosure is presented as a non-limiting example to facilitate a general comprehension of one or more aspects of the disclosed subject matter in connection with hypothetical electrical grid assets. Further, while sample values and assets are illustrated for context, these same sample values and assets are non-limiting and should not be viewed as defining any narrowing of scope. Generally, the assets of FIG. 13 can be assigned to a transmission grid portion (upper portion of figure) or a distribution grid portion (lower portion of figure) as is typical in many electrical power grids worldwide. Transmission systems often are associated with very high AC voltages or even DC transmission of power. Transmission systems are generally presented in the context of delivering high power to regional distribution networks managed by a distribution grid entity.

The conventional electrical distribution grid, as disclosed herein, generally has a flat control structure with control being centralized in a distribution control center (DCC). In contrast, as illustrated in FIG. 13, a non-flat control topography can be employed in accord with the subject matter disclosed herein. In this non-limiting example, three tiers of electrical distribution control system components are illustrated. A top-level (e.g., upper level) control node 1310 (also referred to as TOP 1310) (e.g., comprising a top-level DNNC component and top-level PSBC) can be communicatively coupled to junior level control nodes (e.g., 1320 to 1336), which can comprise junior level DNNC components and junior level PSBCs. In FIG. 13, the interconnections illustrate a basic tree structure topology.

In an aspect, two mid-level control nodes 1320 (also referred to as MID 1320) and 1321 (also referred to as MID 1321) can be logically placed between the bottom-level (e.g., lower level) control node and the top-level control node 1310. Further, the several bottom-level control nodes, such as bottom-level control nodes 1330 through 1336 (also referred to as BOT 1330 through BOT 1336), can be associated with various edge assets. For example, bottom-level control node 1330 can be associated with a city power plant and bottom-level control node 1331 can be associated with a small group of industrial customers. Bottom-level control node 1330 and 1331 can be logically connected to top-level control node 1310 by way of mid-level control node 1320. As such, data and rules can be bubbled up (e.g., communicated upward in the hierarchy) or pushed down (e.g., communicated downward in the hierarchy) by way of this communication path. The bidirectional communication and closed loop control at each level (e.g., top, mid, and bottom) can facilitate improved electrical distribution grid performance. For example, where additional power is needed by the industrial customers associated with bottom-level control node 1331, control signals from mid-level control node 1320 can source more power from city power plant by way of bottom-level control node 1330 without directly involving the top-level control node 1310 or draining energy from the illustrated solar farm or wind farm.

Similarly, mid-level control node 1321 can be associated with bottom-level control node 1332 through 1336. Bottom-level control node 1333, for example, can be logically associated with a plurality of transformers service a portion of a city network. Further, for example, bottom-level control node 1334 can be associated with a single transformer as part of a rural network. Moreover, at bottom-level control node 1332, for example, the control node can be associated with a single consumer, such as the farm. The control nodes also can be associated with distributed power generation, for example bottom-level control node 1335 associated with a solar farm and bottom-level control node 1336 associated with a wind farm. As such, bidirectional communication between top-level control node 1310 and bottom-level control node 1332 through 1336 can be by way of mid-level control node 1321. As such, rules propagated for mid-level control node 1320 and associate child control nodes can be different from rules propagated for mid-level control node 1321 and associated child control nodes. Further, independent closed loop control can be affected, for example, at bottom-level control node 1334 and the associated rural customers without impacting bottom-level control node 1333 and the associated city network.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "operator," "switchman," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory to store executable instructions; and
a processor coupled to the memory, that executes or facilitates execution of the executable instructions to perform operations, comprising:
receiving outage request information related to a request to interrupt a power supply provided to a device in an electrical energy distribution system;
determining switching information related to a set of steps to de-energize a first portion of the electrical energy distribution system associated with the device based on the outage request information;
performing a switching operation to de-energize the first portion of the electrical energy distribution system based on the switching information;
in response to the switching operation, generating tag information for the device that comprises a status of the device, and determining a second portion of the electrical energy distribution system that satisfies a defined criterion and is not associated with the switching operation; and
monitoring the second portion of the electrical energy distribution system that is not associated with the switching operation based on the tag information that is generated in response to the switching operation associated with the first portion of the electrical energy distribution system.

2. The system of claim 1, wherein the receiving the outage request information comprises receiving scheduling information associated with the switching operation to de-energize the first portion of the electrical energy distribution system.

3. The system of claim 1, wherein the determining the switching information comprises generating safety clearance information related to the set of steps to deenergize the first portion of the electrical energy distribution system.

4. The system of claim 1, wherein the determining the switching information comprises generating one or more authorizations related to the set of steps to deenergize the first portion of the electrical energy distribution system.

5. The system of claim 1, wherein the performing the switching operation comprises disconnecting one or more transmission lines associated with the device.

6. The system of claim 1, wherein the tag information comprises an identifier for the device.

7. The system of claim 1, wherein the operations further comprise generating a notification related to the status of the device in response to the switching operation.

8. The system of claim 1, wherein the operations further comprise capturing measurement data associated with the first portion of the electrical energy distribution system in response to the switching operation.

9. The system of claim 1, wherein the device is a first device, and wherein the determining the second portion of the electrical energy distribution system comprises identifying a second device in the second portion of the electrical energy distribution system that is provided a different amount of power in response to the switching operation.

10. The system of claim 9, wherein the modifying the second portion of the electrical energy distribution system comprises modifying the second device that is provided the different amount of power based on the tag information that is generated in response to the switching operation associated with the first portion of the electrical energy distribution system.

11. The system of claim 1, wherein the operations further comprise receiving request information related to a different request to restore the power supply provided to the device, and wherein the operations further comprise determining different switching information related to a different set of steps to energize the first portion of the electrical energy distribution system associated with the device based on the request information related to the different request.

12. The system of claim 11, wherein the operations further comprise performing a different switching operation to energize the first portion of the electrical energy distribution system based on the different switching information.

13. A method, comprising:
receiving, by a device comprising a processor, first information related to a request to interrupt power provided to equipment in a power grid system;
generating, by the device, second information related to a set of actions for de-energizing a first portion of the power grid system associated with the equipment based on the first information;
performing, by the device, a switching operation for de-energizing the first portion of the power grid system based on the second information;
generating, by the device, a tag association with a status the equipment in response to the switching operation;
identifying, by the device, a second portion of the power grid system that satisfies a defined criterion and is not associated with the switching operation; and
monitoring, by the device, the second portion of the power grid system that is not associated with the switching operation based on the tag association that is generated in response to the switching operation associated with the first portion of the power grid system.

14. The method of claim 13, wherein the generating the second information comprises generating one or more permits related to the set of actions for deenergizing the first portion of the power grid system.

15. The method of claim 13, wherein the generating the tag comprises generating an identifier for the equipment in response to the switching operation.

16. The method of claim 13, further comprising generating, by the device, data associated with one or more measurements associated with the first portion of the power grid system in response to the switching operation.

17. The method of claim 13, wherein the equipment is first equipment, and wherein the determining the second portion of the power grid system comprises identifying second equipment in the second portion of the power grid system that is associated with different operation limits in response to the switching operation.

18. A non-transitory computer readable storage device comprising executable instructions that, in response to execution, cause a device comprising a processor to perform operations, comprising:
receiving a request to interrupt electrical power provided to a first portion of an electrical energy distribution system;
determining a set of actions associated with the electrical energy distribution system based on the request;
performing a switching operation to interrupt the electrical power provided to the first portion of the electrical energy distribution system in response to a determination that the set of actions are performed;
in response to the switching operation, generating tag data that comprises a status of first equipment associated with the first portion of the electrical energy distribution system, and identifying second equipment associated with a second portion of the electrical energy distribution system that satisfies a defined criterion and is not associated with the switching operation; and
monitoring the second equipment associated with the second portion of the electrical energy distribution system based on the tag data that is generated in response to the switching operation associated with the first portion of the electrical energy distribution system.

19. The non-transitory computer readable storage device of claim 18, wherein the operations further comprise generating an identifier for the first equipment associated with the first portion of the electrical energy distribution system in response to the switching operation.

20. The non-transitory computer readable storage device of claim 18, wherein the operations further comprise generating a notification related to the status of the first equipment associated with the first portion of the electrical energy distribution system in response to the switching operation.

* * * * *